(12) United States Patent
Sachs et al.

(10) Patent No.: US 11,241,741 B2
(45) Date of Patent: Feb. 8, 2022

(54) THERMALLY ROBUST NOZZLE FOR 3-DIMENSIONAL PRINTING AND METHODS OF USING SAME

(71) Applicant: Desktop Metal, Inc., Burlington, MA (US)

(72) Inventors: Emanuel Michael Sachs, Newton, MA (US); Uwe Bauer, Cambridge, MA (US); Jonah Samuel Myerberg, Lexington, MA (US); Nicholas Graham Bandiera, Burlington, MA (US)

(73) Assignee: Desktop Metal, Inc., Burlington, MA (US)

( * ) Notice: Subject to any disclaimer, the term of this patent is extended or adjusted under 35 U.S.C. 154(b) by 349 days.

(21) Appl. No.: 16/035,296

(22) Filed: Jul. 13, 2018

(65) Prior Publication Data

US 2019/0030602 A1     Jan. 31, 2019

Related U.S. Application Data

(60) Provisional application No. 62/533,286, filed on Jul. 17, 2017, provisional application No. 62/532,323, filed on Jul. 13, 2017.

(51) Int. Cl.
*B22F 3/00*        (2021.01)
*B22F 10/10*      (2021.01)
(Continued)

(52) U.S. Cl.
CPC ............ *B22F 10/10* (2021.01); *B29C 64/118* (2017.08); *B29C 64/209* (2017.08); *B33Y 10/00* (2014.12);
(Continued)

(58) Field of Classification Search
CPC ......... B22F 10/10; B33Y 10/00; B33Y 70/00; B29C 64/118; B29C 64/209
See application file for complete search history.

(56) References Cited

U.S. PATENT DOCUMENTS

2009/0252821 A1*   10/2009   Wigand ................ B33Y 10/00
                                                                                425/143
2009/0314391 A1    12/2009   Crump et al.
2018/0141274 A1*   5/2018   Fink ......................... G01K 7/16

OTHER PUBLICATIONS

Jerez-Mesa et al ("Finite element analysis of the thermal behavior of a RepRap 3D printer liquefier", Mechatronics, vol. 36, Jun. 2016, pp. 119-126). (Year: 2016).*

(Continued)

*Primary Examiner* — Nicholas A Wang
*Assistant Examiner* — Jiangtian Xu
(74) *Attorney, Agent, or Firm* — Oak Law, PLLC; Jonathan D. Hall

(57) ABSTRACT

For conditioning build material for fused filament fabrication, thermal power is both added to and removed from a nozzle in a manner that can reduce sensitivity of the nozzle temperature to fluctuations in build material feed rate. The amount of thermal power added is at least as large as the sum of the amount removed, the amount to condition the material, and losses to the environment. The amount removed may be at least as large as half the thermal power required to condition the material to extrusion temperature, and may be comparable to, or much larger than the conditioning amount. The larger the ratio of the amount removed to the conditioning amount, the less sensitive the nozzle temperature will be to fluctuations in build material feed rate. Fine temperature control arises, enabling building with metal-containing multi-phase materials or other materials that have a narrow working temperature range.

9 Claims, 19 Drawing Sheets

(51) Int. Cl.
*B33Y 10/00* (2015.01)
*B29C 64/118* (2017.01)
*B29C 64/209* (2017.01)
*B33Y 30/00* (2015.01)
*C22C 1/04* (2006.01)
*B33Y 50/02* (2015.01)
*B33Y 70/00* (2020.01)

(52) U.S. Cl.
CPC ........... B33Y 30/00 (2014.12); *B22F 2998/10* (2013.01); *B22F 2999/00* (2013.01); *B33Y 50/02* (2014.12); *B33Y 70/00* (2014.12); *C22C 1/0408* (2013.01)

(56) References Cited

OTHER PUBLICATIONS

Jerez-Mesa, R. et al., "Finite Element Analysis of the Thermal Behavior of a RepRap 3D printer liquefier", Mechatronics, Apr. 29, 2016, 8 pages.
ISA, "PCT Application No. PCT/US18/42119 International Search Report and Written Opinion dated Oct. 8, 2018", , 12 pages.

* cited by examiner $Q_i$ = Power added by heater
$Q_f$ = Power transferred to build material
$Q_l$ = Power lost to ambient
$Q_o$ = Power removed by cooler $Q_i$ = Power added by heater
$Q_f$ = Power transferred to build material
$Q_l$ = Power lost to ambient
$Q_o$ = Power removed by cooler

1100

ADD THERMAL POWER TO NOZZLE NEAR OUTLET TO SET OUTLET TEMPERATURE
1102

REMOVE THERMAL POWER FROM NOZZLE NEAR INLET TO SET INLET TEMPERATURE
1104

DRIVE BUILD MATERIAL THROUGH NOZZLE
1106

MONITOR TEMPERATURE NEAR NOZZLE OUTLET AND NEAR INLET
1108

ADD THERMAL POWER TO NOZZLE NEAR OUTLET AND/OR REMOVE THERMAL POWER FROM NOZZLE NEAR INLET TO MAINTAIN PREDETERMINED OUTLET TEMPERATURE AND PREDETERMINED INLET TEMPERATURE
1110

*Fig. 11*

THERMALLY ROBUST NOZZLE FOR 3-DIMENSIONAL PRINTING AND METHODS OF USING SAME

CROSS-REFERENCE TO RELATED APPLICATIONS

This application claims the benefit of U.S. Provisional App. No. 62/532,323, filed on Jul. 13, 2017, entitled Thermal Gradient Nozzle, the full disclosure of which is hereby incorporated by reference in its entirety. This application also claims the benefit of U.S. Provisional App. No. 62/533,286, filed on Jul. 17, 2017, entitled Additive Fabrication Using Variable-Speed Extrusion, the full disclosure of which is hereby incorporated by reference in its entirety.

This application is related to the following U.S. patent applications: U.S. Prov. App. No. 62/268,458 filed on Dec. 16, 2015; U.S. application Ser. No. 15/382,535 filed on Dec. 16, 2016; International App. No. PCT/US17/20817 filed on Mar. 3, 2017; U.S. Prov. App. No. 62/303,310 filed on Mar. 3, 2016; and U.S. application Ser. No. 15/059,256 filed on Mar. 2, 2016. Each of the foregoing applications is hereby incorporated by reference in its entirety.

TECHNICAL FIELD

The present disclosure generally relates to additive manufacturing, and more specifically to a thermal management of a nozzle and build material used to additively fabricate an object.

BACKGROUND

Fused filament fabrication (FFF) provides a technique for fabricating three-dimensional objects from a thermoplastic or similar materials. Machines using this technique can fabricate three-dimensional objects additively by depositing lines of material in layers to additively build up a physical object from a computer model. While these polymer-based techniques have been changed and improved over the years, the physical principles applicable to polymer-based systems may not be applicable to metal-based systems, which tend to pose different challenges. There remains a need for three-dimensional printing techniques suitable for metal additive manufacturing.

SUMMARY

One aspect of a method invention hereof is method for conditioning MCMP build material within a bore of a nozzle, the nozzle having an inlet and an outlet and the bore there-between, through which the build material passes from the inlet to the outlet. The build material has a working temperature range that includes a first temperature for mechanically driving the material into the inlet and a second, greater temperature, for extruding the build material out from the nozzle outlet. There is an amount of thermal power required to condition build material at a steady state passing through the nozzle to the second temperature, this amount being termed the conditioning amount of thermal power. The method comprises providing a quantity of build material within the nozzle and removing a first amount of thermal power from the nozzle near the nozzle inlet, the first amount of thermal power being at least half of the conditioning amount of thermal power. The method further comprises adding a second amount of thermal power to the nozzle near the nozzle outlet, which second amount of thermal power is greater than the sum of the first amount of thermal power and the conditioning amount of thermal power. The first amount of thermal power may be larger, including comparable to, twice as large, five times as large, and ten times as large as the conditioning amount of thermal power, or even larger. There is also an amount of thermal power that is lost to the environment around the nozzle. The step of adding a second amount of thermal power to the nozzle near the nozzle outlet, may comprise adding a second amount of thermal power that is approximately equal to the sum of the first amount of thermal power and the conditioning amount of thermal power, and the amount of thermal power that is lost to the environment around the nozzle.

A related method aspect also includes the step of measuring the temperature of the nozzle outlet, in which case, the magnitude of the second amount of thermal power can be determined in part based on the measured outlet temperature, such that the temperature of the nozzle at the outlet is at least as large as the second temperature. A closely related method aspect further includes the step of measuring the temperature of the nozzle inlet, in which case, the magnitude of the amount of thermal power that is removed can be determined in part based on the measured inlet temperature such that the temperature of the nozzle at the inlet less than or equal to the first temperature.

With many important embodiments of the method, coolant fluid is flowed near the nozzle inlet to remove thermal power.

According to another important method aspect of inventions hereof, the build material may comprise a metal alloy that exhibits a multi-phase equilibrium between a solid phase and a liquid phase and which is characterizeable by a phase diagram having a solidus temperature and a liquidus temperature. The build material is provided having a composition that assumes a multi-phase condition at temperatures between the solidus temperature and the liquidus temperature. Suitable build materials include, but are not limited to, alloys where the primary alloy elements are selected from the metal alloy systems including, but not limited to: lead/tin (Pb/Sn); aluminum/silicon (Al/Si); aluminum/zinc (Al/Zn); tin/copper (Sn/Cu); and Aluminum Silicon Magnesium (Mg/Si/Al).

With another beneficial method aspect of inventions hereof, the MCMP material can comprise mixture of a metallic composition and a high-temperature inert second phase, wherein the metallic composition includes a metal or a metal alloy and wherein the high-temperature inert second phase includes a composition that remains a solid at a temperature substantially above a liquidus temperature of the metallic composition. The inert second phase may be a ceramic, an intermetallic, or a metallic. Alloys that exhibit a peritectic, a eutectic, or that are isomorphous are suitable for use in methods hereof. The MCMP material may be a metal-loaded extrudable composite.

Another distinctive aspect of a method invention hereof is method for conditioning a build material within a bore of a nozzle, the nozzle having an inlet and an outlet through which the build material passes. The build material has a working temperature range that includes an extrusion temperature for extruding the build material out from the nozzle outlet. There is an amount of thermal power required to condition build material passing through the nozzle at a steady state to the extrusion temperature, this amount being termed the conditioning amount of thermal power. The method specifically comprises providing a quantity of build material within the nozzle and removing a first amount of thermal power from the nozzle at least ½ as large as the conditioning amount of thermal power. The method also comprises adding a second amount of thermal power to the nozzle that is greater than the sum of the first amount of thermal power and the conditioning amount of thermal power. The first amount of thermal power may be larger, including comparable to, twice as large, five times as large, and ten times as large as the conditioning amount of thermal power, or even larger. There is also an amount of thermal power that is lost to the environment around the nozzle. The step of adding a second amount of thermal power to the nozzle near the nozzle outlet, comprises adding a second amount of thermal power that is approximately equal to the sum of the first amount of thermal power and the conditioning amount of thermal power, and the amount of thermal power that is lost to the environment around the nozzle.

A closely related method aspect also includes the step of measuring the temperature of the nozzle outlet, in which case, the magnitude of the second amount of thermal power can be determined in part based on the measured outlet temperature, such that the temperature of the nozzle at the outlet is at least as large as the second temperature.

With related method aspects of an invention hereof, the step of removing an amount of thermal power may comprise thermally coupling a flowing coolant fluid near the nozzle.

The build material may comprise a thermoplastic, or a metal alloy that exhibits a multi-phase equilibrium between a solid phase and a liquid phase and which is characterizeable by a phase diagram having a solidus temperature and a liquidus temperature, the step of providing build material comprising providing build material having a composition that assumes a multi-phase condition at temperatures between the solidus temperature and the liquidus temperature.

According to an important method aspect hereof, the first amount of thermal power may be removed from the nozzle near the nozzle outer surface. The second amount of thermal power may be added to the nozzle near the nozzle bore. In a related aspect, the temperature of the nozzle may be measured at an inner location between the core and the location of adding thermal power. In which case, the magnitude of the second amount of thermal power may be determined based in part on the measured temperature at the inner location such that the temperature of the nozzle at the outlet is at least as large as the second temperature. It is also beneficial to measure the temperature of the nozzle at an outer location between the nozzle outer surface and the location of removing thermal power. In such a case, the magnitude of the second amount of thermal power may be further determined in part based also on the measured temperature at the outer location such that the temperature of the nozzle at the outlet is at least as large as the second temperature.

An important apparatus aspect of an invention hereof is a nozzle for conditioning and extruding MCMP build material, the build material having a working temperature range that includes a first temperature for mechanically driving the material into nozzle and a second, greater temperature, for extruding the build material out from the nozzle. There is an amount of thermal power required to condition build material at a steady state passing through the nozzle to the second temperature, this amount being termed the conditioning amount of thermal power. The nozzle comprises an inlet, an outlet, and a bore between the inlet and the outlet, through which bore the build material passes from the inlet to the outlet. Near to the inlet is a removal thermal couple configured to remove a first amount of thermal power from the nozzle to a thermal power sink, the removal couple having a capacity to remove at least ½ the conditioning amount of thermal power. Near to the outlet, an additive thermal couple is configured to add a second amount of thermal power from a source to the nozzle, the additive couple having a capacity capable to add a second amount of thermal power that is greater than the sum of the first amount of thermal power and the conditioning amount of thermal power. Related aspects may also include a temperature sensor located near to the inlet, and also near the outlet. A heater may be coupled to the additive thermal couple, and a cooling fluid source may be coupled to the removal thermal couple. The removal couple may have a larger capacity, being at least equal to the conditioning amount of thermal power, or twice as large or five or ten times as large, or even larger.

Another important apparatus aspect of an invention hereof is a nozzle for conditioning and extruding build material, the build material having a working temperature range that includes an extrusion temperature, for extruding the build material out from the nozzle. There is an amount of thermal power required to condition build material at a steady state passing through the nozzle to the extrusion temperature, this amount being termed the conditioning amount of thermal power. The nozzle comprises an inlet, an outlet, and a bore between the inlet and the outlet, through which bore the build material passes from the inlet to the outlet. There is a removal thermal couple configured to remove a first amount of thermal power from the nozzle to a thermal power sink, the removal couple having a capacity to remove at least ½ the conditioning amount of thermal power. There is also an additive thermal couple that is configured to add a second amount of thermal power from a source to the nozzle, the additive couple having a capacity capable to add a second amount of thermal power that is greater than the sum of the first amount of thermal power and the conditioning amount of thermal power. The removal couple may have a larger capacity, being at least equal to the conditioning amount of thermal power, or twice as large or five or ten times as large, or even larger. The nozzle body has an outer surface, and according to one aspect, the removal thermal couple may be located near the body outer surface. In a closely related aspect, the additive thermal couple may be located near the nozzle bore. A cooling fluid source may be coupled to the removal thermal couple.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 11 shows schematically in block diagram form a method for controlling the temperature profile of a build material within the interior of a nozzle having two temperature control points.

DETAILED DESCRIPTION

Figure 1:
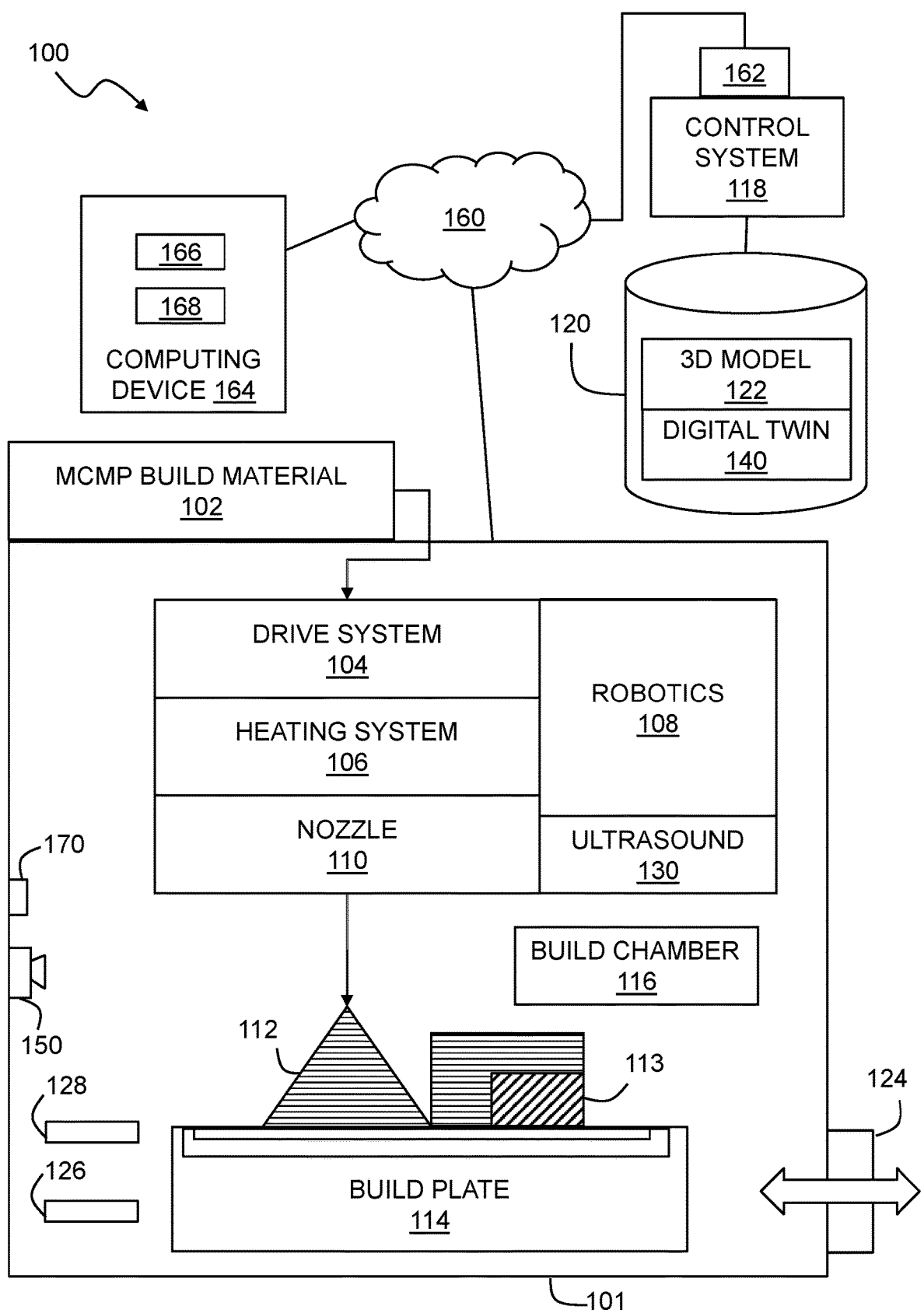
FIG. 1 is a block diagram of an additive manufacturing system.

Embodiments will now be described more fully hereinafter with reference to the accompanying figures, in which preferred embodiments are shown. The foregoing may, however, be embodied in many different forms and the following description should not be construed as limiting unless explicitly stated otherwise.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term or should generally be understood to mean and/or and so forth.

Recitation of ranges of values herein are not intended to be limiting, referring instead individually to any and all values falling within the range, unless otherwise indicated herein, and each separate value within such a range is incorporated into the specification as if it were individually recited herein. The words about, approximately, substantially, or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language (e.g., such as, or the like) provided herein, is intended merely to better illuminate the embodiments and does not pose a limitation on the scope of the embodiments or the claims. No language in the specification should be construed as indicating any unclaimed element as essential to the practice of the claimed embodiments.

In the following description, it is understood that terms such as first, second, top, bottom, up, down, and the like, are words of convenience and are not to be construed as limiting terms unless specifically stated to the contrary.

In general, the following description emphasizes three-dimensional printers using metal as a build material for forming a three-dimensional object. However, there are some apparatus and method aspects of inventions hereof that are also suitable for use with build materials that do not include metal, but which do assume a physical state having a rheology including a viscosity that is suitable for extrusion.

Regarding metal build materials more specifically, this description emphasizes three-dimensional printers that deposit metal, metal alloys, or other metallic compositions for forming a three-dimensional object using fused filament fabrication or similar techniques. In these techniques, a bead of material is extruded in a layered series of two-dimensional patterns to form a three-dimensional object from a digital model. The beads may also be referred to as roads or paths or lines. However, it will be understood that other additive manufacturing techniques and other build materials may also or instead be used with many of the techniques contemplated herein. Such techniques may benefit from the systems and methods described below, and all such printing technologies are intended to fall within the scope of this disclosure, and within the scope of terms such as printer, three-dimensional printer, fabrication system, additive manufacturing system, and so forth, unless a more specific meaning is explicitly provided or otherwise clear from the context. Further, if no type of printer is stated in a particular context, then it should be understood that any and all such printers are intended to be included, such as where a particular material, support structure, article of manufacture, or method is described without reference to a particular type of three-dimensional printing process.

FIG. 1 is a block diagram of an additive manufacturing system. In general, the additive manufacturing system may include a three-dimensional printer 101 (or simply printer 101) that deposits a metal, metal alloy, metal composite or the like, using fused filament fabrication or any similar process. In general, the printer 101 may include a multiphase metallic build material 102 that is propelled by a drive system 104 and heated to an extrudable state by a heating system 106, and then extruded through one or more nozzles 110. By concurrently controlling robotics 108 to position the nozzle(s) along an extrusion path relative to a build plate 114, an object 112 may be fabricated on the build plate 114 which may be situated within a build chamber 116. In general, a control system 118 may manage operation of the printer 101 to fabricate the object 112 according to a three-dimensional model using a fused filament fabrication process or the like. The types of materials suitable as a build material are discussed below.

Figure 2:
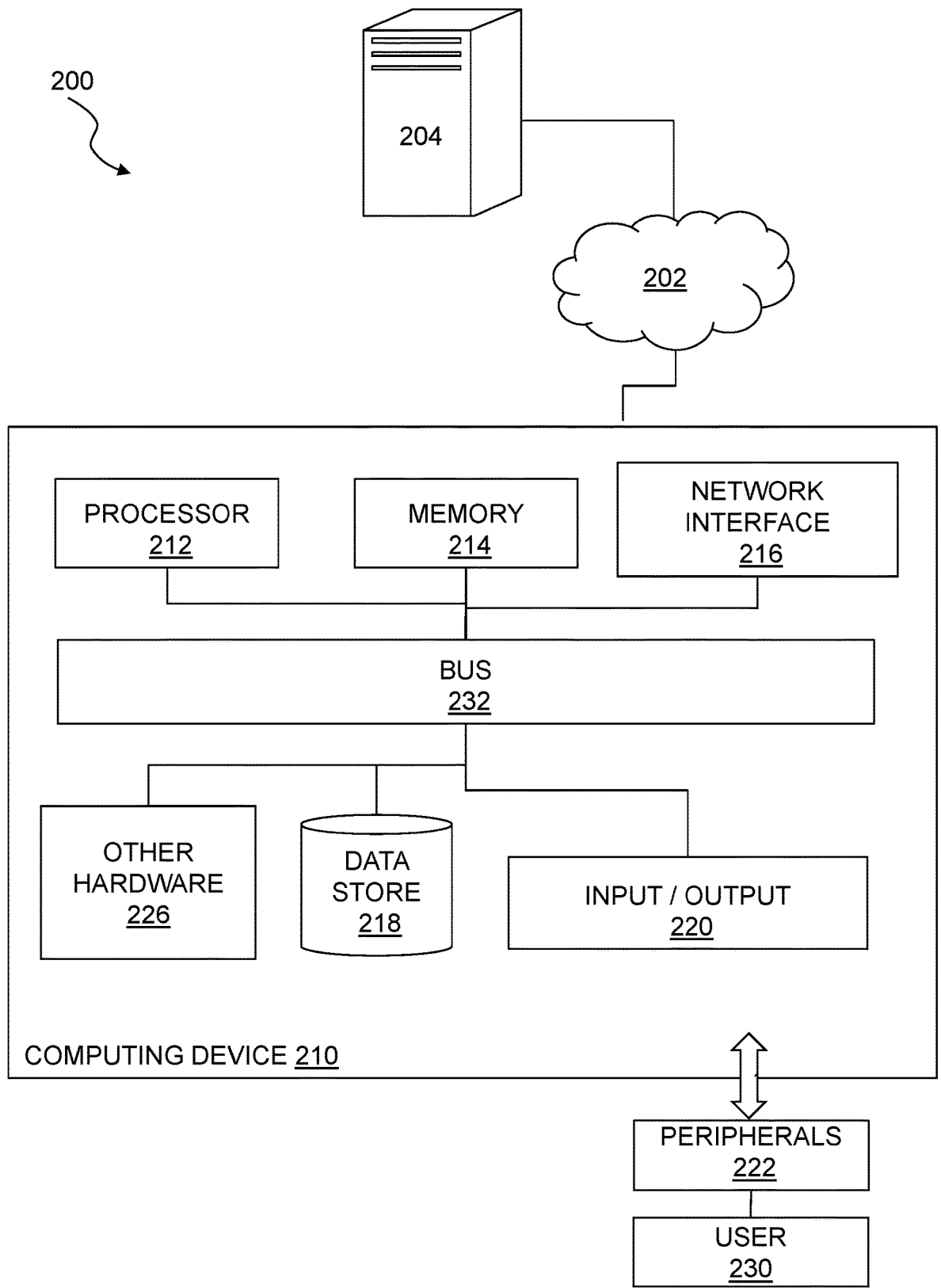
FIG. 2 is a block diagram of a computer system.

FIG. 2 is a block diagram of a computer system, which may be used for any of the computing devices, control systems or other processing circuitry described herein. The computer system 200 may include a computing device 210, which may also be connected to an external device 204 through a network 202. The computing device 210 may include any of the controllers described herein (or vice-versa), or otherwise be in communication with any of the controllers or other devices described herein. The computing device 210 may include a processor 212, a memory 214, a network interface 216, a data store 218, and one or more input/output devices 220. The computing device 210 may further include or be in communication with peripherals 222. A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth. A bus 232 or combination of busses may serve as an electromechanical platform for interconnecting components of the computing device 200.

Figure 3:
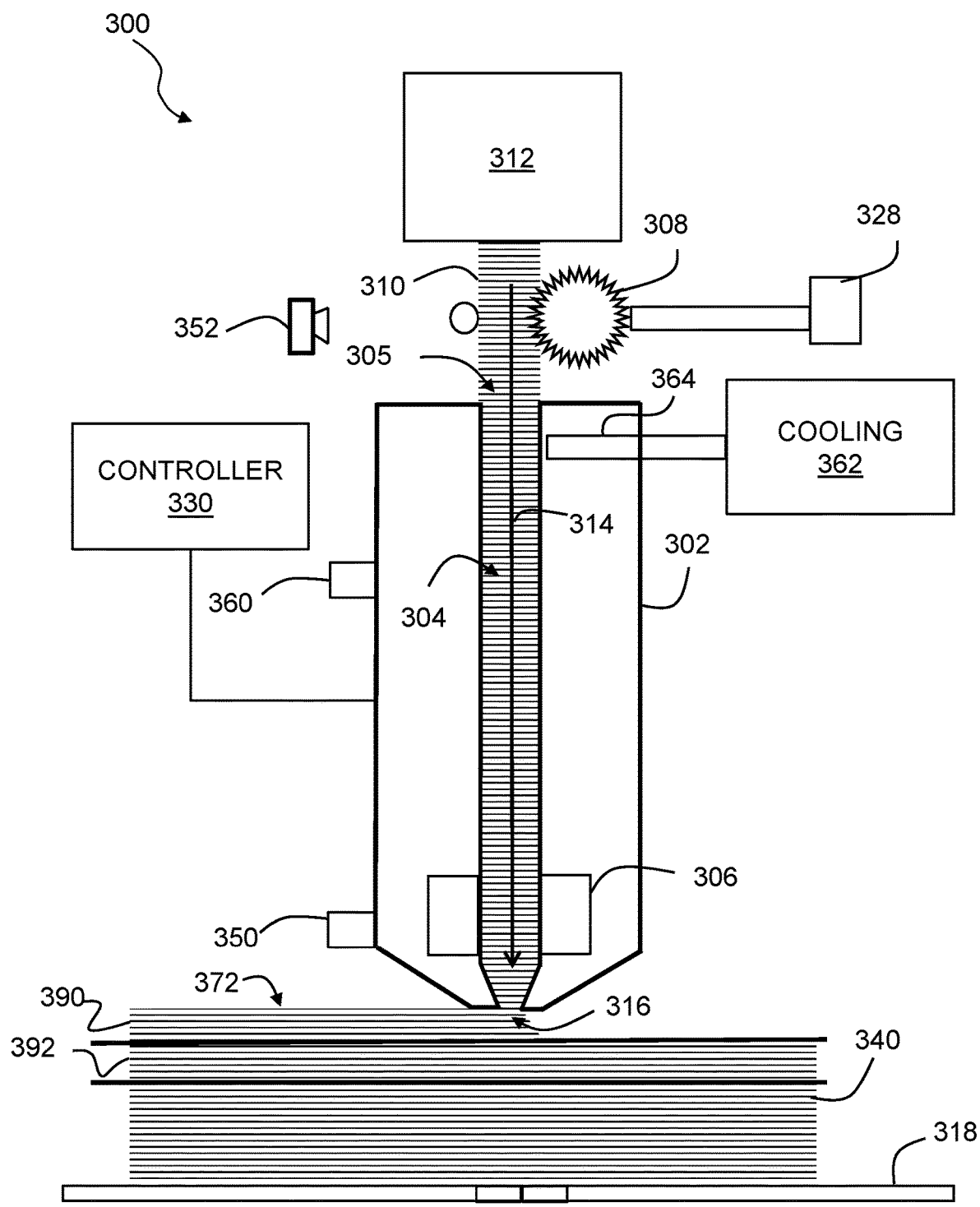
FIG. 3 shows an extruder for a three-dimensional printer.

FIG. 3 shows an extruder 300 for a three-dimensional printer. In general, the extruder 300 may include a nozzle 302, a nozzle bore 304, a heating system 306, and a drive system 308 such as any of the systems described herein, or any other devices or combination of devices suitable for a printer that fabricates an object from a computerized model using a fused filament fabrication process and a metallic build material as contemplated herein. In general, the extruder 300 may receive a build material 310 from a source 312, such as any of the build materials and sources described herein, and advance the build material 310 along a feed path (indicated generally by an arrow 314) toward an opening 316 of the nozzle 302 for deposition on a build plate 318 or other suitable surface. The term build material is used herein interchangeably to refer to metallic build material, species and combinations of metallic build materials, or any other build materials (such as thermoplastics), all as discussed below. As such, references to build material 310 should be understood to include metallic build materials, or multi-phase metallic build materials or any of the other build material or combination of build materials described herein, including a thermoplastic, under specific conditions, unless a more specific meaning is provided or otherwise clear from the context.

Many metallic build materials may be used with the techniques described herein. In general, any build material with metallic content that provides a useful working temperature range with rheological behavior suitable for heated extrusion may be used as a metallic build material as contemplated herein. One particularly desirable class of metallic build materials are metallic multi-phase materials. Such multi-phase materials can be any wholly or partially metallic mixture that exhibits a working temperature range in which at least one solid phase and at least one liquid phase co-exist, resulting in a rheology suitable for fused filament fabrication or similar techniques described herein.

The following discussion will initially describe many different materials that exhibit common, beneficial properties suitable for use in metallic additive fabrication as contemplated herein. The term metal containing multi-phase type material, referred to in shortened form as an MCMP type, or simply an MCMP material, will be used to refer to all of the materials that are about to be described, and any other suitable materials not explicitly mentioned, but which exhibit similarly suitable properties such as a working temperature range in which at least one solid phase and at least one liquid phase co-exist, resulting in a rheology suitable for fused filament fabrication or similar techniques described herein.

In one aspect, a MCMP build material may be a metal alloy that exhibits a multi-phase equilibrium between at least one solid and at least one liquid phase. Such a semi-solid state may provide a working temperature range with rheological behavior suitable for use in fused filament fabrication as contemplated herein. For example, the composite may, within the working temperature range, form a non-Newtonian paste or Bingham fluid with a non-zero shear stress at zero shear strain. While the viscous fluid nature of the composite permits extrusion or other similar deposition techniques, this non-Newtonian characteristic can permit the deposited material to retain its shape against the force of gravity so that a printed object can retain a desired form until the composite material cools below a solidus or eutectic temperature of the metallic base.

For example a composition of a eutectic alloy system, which is not the eutectic composition, may exhibit such a multiphase equilibrium. Compositions within an alloy system with a eutectic may melt over a range of temperatures rather than at a melting point and thus provide a semi-solid state with a mixture of at least one solid and at least one liquid phase that collectively provide rheological behavior suitable for fused filament fabrication or similar additive fabrication techniques. This mixture may be at equilibrium or stable over the timescales of the extrusion process.

Figure 4A:
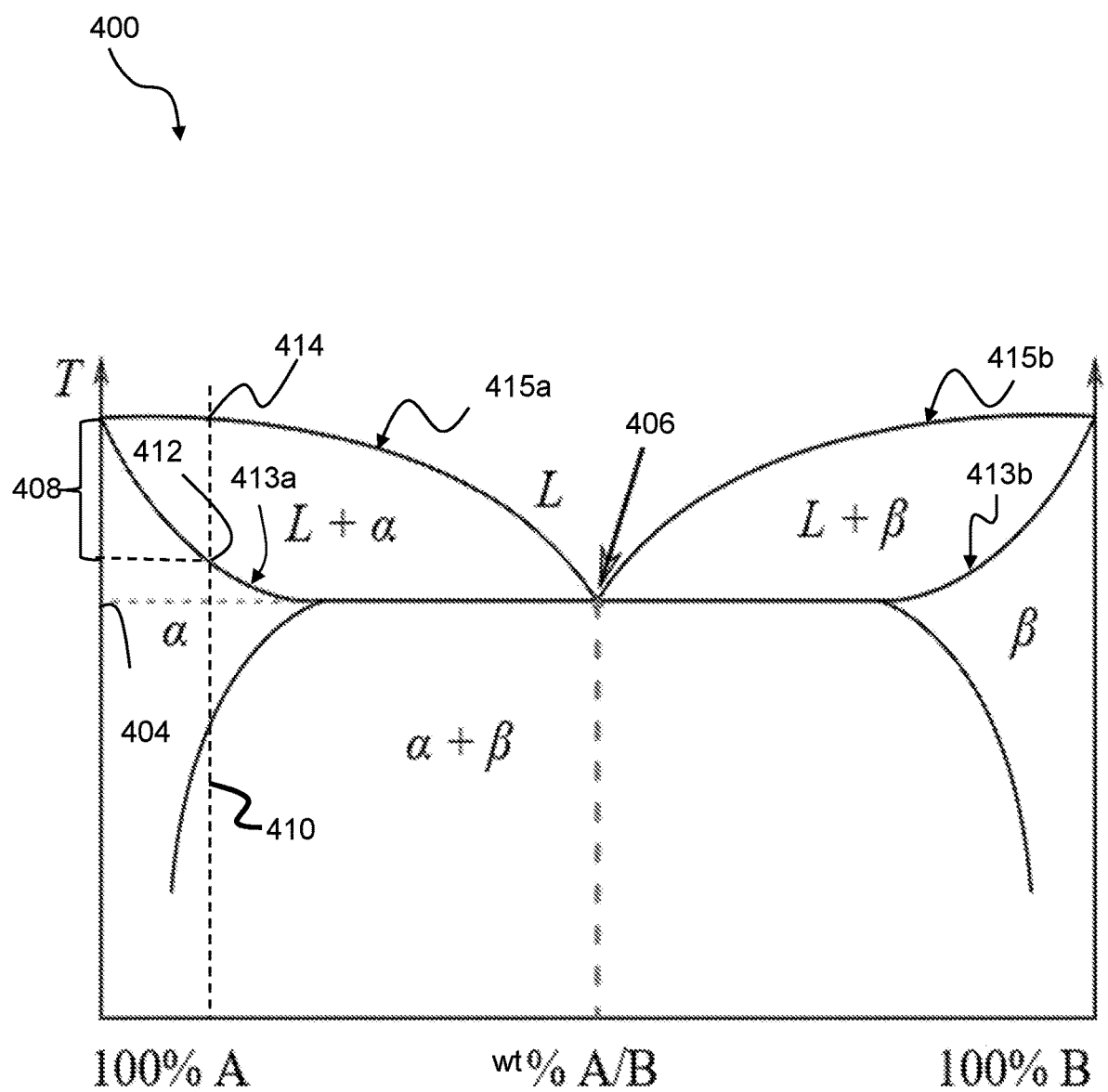
FIG. 4A shows a phase diagram for a generic eutectic system, for which, within a temperature range, there are compositions that exist in a multi-phase condition of at least one solid phase and one liquid phase.

FIG. 4A shows a phase diagram 400 for a simple eutectic alloy system, exhibiting an alloy composition suitable for use as a MCMP build material in the methods and systems described herein. The eutectic composition is the composition present at the vertical dashed line that intersects the point 406. The point 406 is at the intersection of the lines that represent the eutectic composition (vertical dashed) and the eutectic temperature 404. In general, the build material may include an alloy with a working temperature range in which the mixture contains a solid and liquid phase in an equilibrium proportion dependent on temperature. The solid and liquid phases coexist within the temperature and composition combinations within the two bound regions labeled as L+α and L+β, respectively. This notation signifies that within that region, the build material exists as a mixture of a liquid phase L made up of components A and B and a solid phase with a specific crystalline structure. The solid phase is denoted as α, for compositions to the left of the eutectic composition (higher concentrations of component A) and as β for compositions to the right of the eutectic composition (higher concentrations of component B). Where α denotes a solid solution of B in an A matrix and β denotes a solid solution of A in a B matrix. This multi-phase condition usefully increases viscosity of the material above the pure liquid viscosity while in the working temperature range to render the material in a flowable state exhibiting rheological behavior suitable for fused filament fabrication or similar extrusion-based additive manufacturing techniques.

It should be understood that whenever alloy systems are discussed which have two constituents, that is, binary alloy systems, the same concepts will apply to alloy systems with three, four, and any number of constituents. As an example, a quaternary system can also have a eutectic composition.

The alloy composition just described is one instance of a MCMP material of a general class of materials that are suitable for use with Inventions hereof. More are described below.

For another instance of a MCMP material, it is beneficial to add an inert high-temperature second phase into a metal alloy. The metal alloy may be a simple alloy that only exhibits one (liquid) phase within a given temperature range. In that case, the inert material provides the second phase, and the desirable viscosity properties. Alternatively, the inert material may be provided to an alloy that itself demonstrates a multi-phase condition within a working temperature range, as discussed above, in which case, the alloy plus inert material can give rise to a more complicated multi-phase situation, with possibly one liquid phase and two solid phases, possibly at different temperatures, with a semi-solid state to further control viscosity.

For another instance of MCMP materials, an inert second phase may be used with an alloy with substantially the eutectic composition. This combination provides a dual advantage of the relatively low melting temperature that is characteristic of the eutectic composition, along with the desirable flow characteristics that can be imparted by an added inert second phase.

In FIG. 4A, composition and temperature combinations above the liquidus curves 415a and 415b will be a single liquid phase L. When an alloy in a eutectic alloy system solidifies, its components may solidify at different temperatures, resulting in a semi-solid suspension of solid and liquid components prior to full solidification. The working temperature for such an alloy composition is generally a range of temperatures between a lowest and highest melting temperature. In a mixture around the eutectic point 406, the lowest melting temperature (at which this mixture remains partially molten) is the eutectic temperature 404. The highest melting temperature will generally be a function of the percentage of the components A and B. In regions far from the eutectic composition such that the eutectic line terminates, i.e., at the far left or the far right of the phase diagram 400, the lowest melting temperature may be somewhat above the eutectic temperature, e.g., at the solidus temperature of the alloy. The solidus temperatures for different compositions lie upon the solidus curves 413a and 413b, which also are collinear for some of their extent with a horizontal line at the eutectic temperature 404. For example, for a composition in a eutectic alloy system with a very high fraction of material A (as indicated by a dashed vertical line 410), the composition may have a solidus temperature 412 somewhat above the eutectic temperature 404, and a liquidus temperature 414 at the highest liquidus temperature for the composition. Either type of composition, may have a working temperature range 408 including a range of temperatures above a lowest melting temperature (e.g., where the entire system becomes solid) and below a highest melting temperature (e.g., where the entire system becomes liquid) where the composition, or a corresponding metallic build material includes solid and liquid phases in a combination providing a variable, temperature-dependent viscosity and rheological behavior suitable for extrusion. This working temperature range 408 will vary by composition and alloying elements, but may be adapted for a wide range of metal alloys for use in a fused filament fabrication process or the like as contemplated herein.

FIGS. 4A, 4B, 4C, 4D and 6, show phase diagrams of example eutectic alloy systems that exhibit compositions suitable for use as a build material in the methods and systems described herein.

Figure 4B:
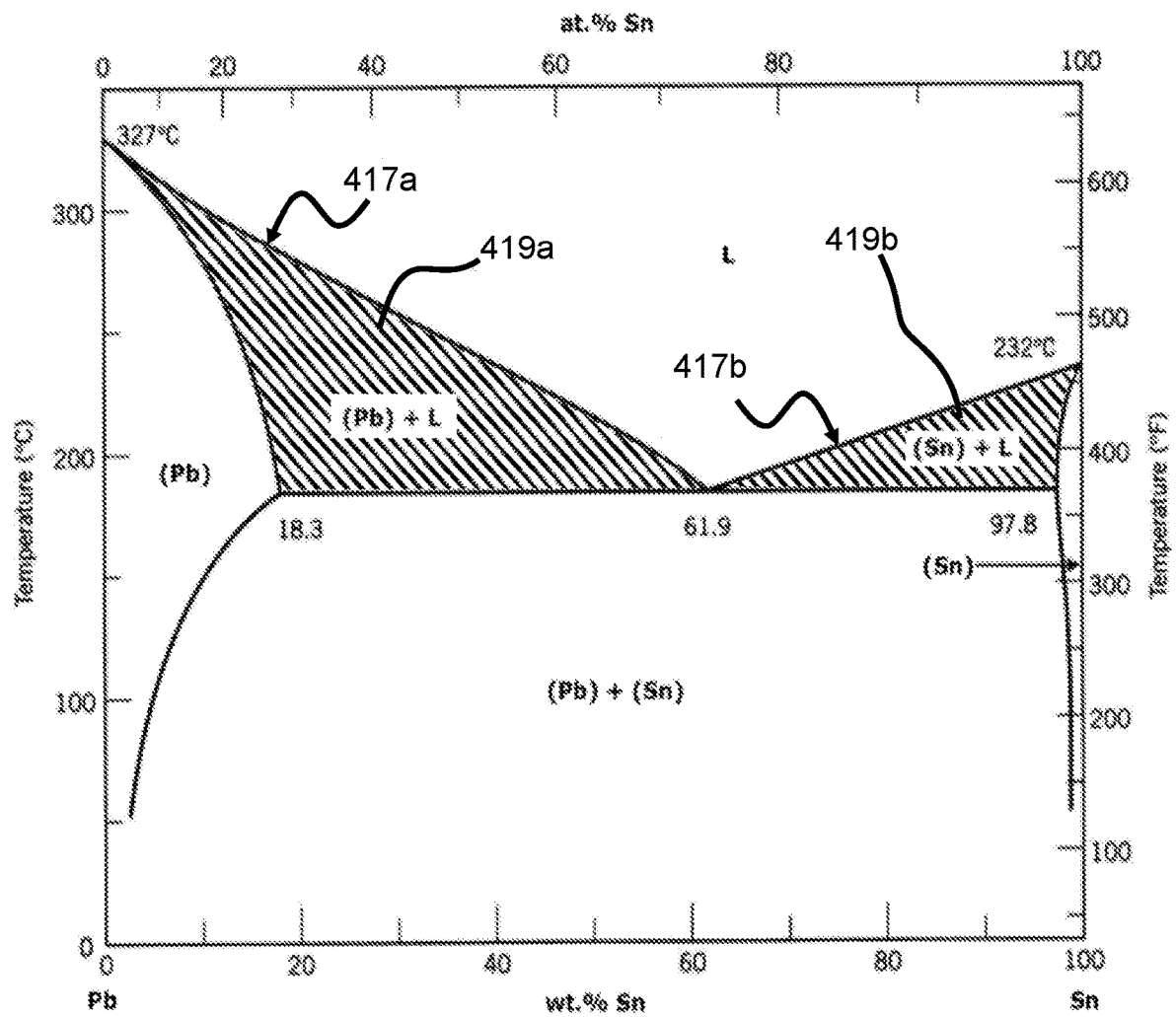
FIG. 4B shows a phase diagram for a lead and tin system.
Figure 4C:
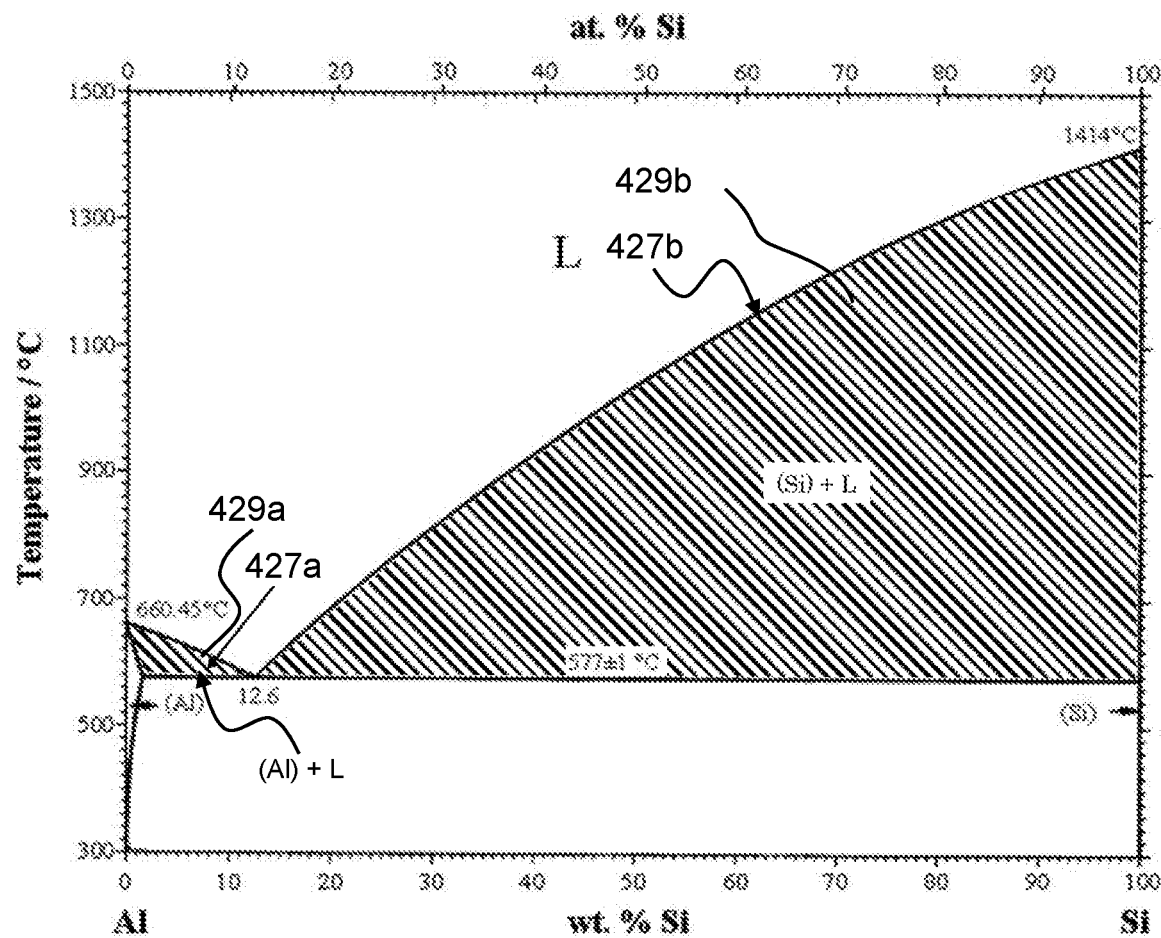
FIG. 4C shows a phase diagram for an aluminum and silicon system.

FIG. 4B shows in graphical form a binary phase diagram for the Pb (lead) and Sn (tin) system. The eutectic composition is at 61.9 weight percentage (wt %) Sn, and the eutectic temperature is 183 degrees C. For composition and temperature combinations within the region denoted L, the material will be in a single phase liquid state. For composition and temperature combinations within the two cross-hatched regions the material will be in a two-phase state where a liquid and solid phase coexist in equilibrium proportions. In the region 419a, on the left hand side—higher Pb concentration—of the eutectic composition, the liquid L coexists with the solid (Pb) phase. In the region 419b, on the right hand side—higher Sn concentration—of the eutectic composition, the liquid L coexists with the solid (Sn) phase. Here (Pb) denotes a solid solution of Sn in a Pb matrix and (Sn) denotes a solid solution of Pb in a Sn matrix. The liquidus curves below the liquid region L are indicated at 417a bounding the liquid L plus solid (Pb) region and at 417b bounding the liquid L plus solid (Sn) region FIG. 4C shows in graphical form a phase diagram for an Al (aluminum) and Si (silicon) system. The eutectic composition is at 12.6 wt % Si, and the eutectic temperature is at approximately 577 degrees C. For composition and temperature combinations within the region denoted L the material will be in a single phase liquid state. For composition and temperature combinations within the two cross-hatched regions 429a and 429b the material will be in a two phase state where a liquid and solid phase coexist in equilibrium proportions. In the region 429a, to the left of the eutectic composition, where there is a higher Al concentration—the liquid L coexists with solid (Al) phase. In the region 429b, to the right of the eutectic composition, where there is a higher Si concentration, the liquid L coexists with solid (Si) phase. Where (Al) denotes a solid solution of Si in an Al matrix and (Si) denotes a solid solution of Al in a Si matrix. The liquidus curves below the liquid region L are indicated at 427a bounding the liquid L plus solid (Al) region and at 427b bounding the liquid L plus solid (Si) region.

Figure 4D:
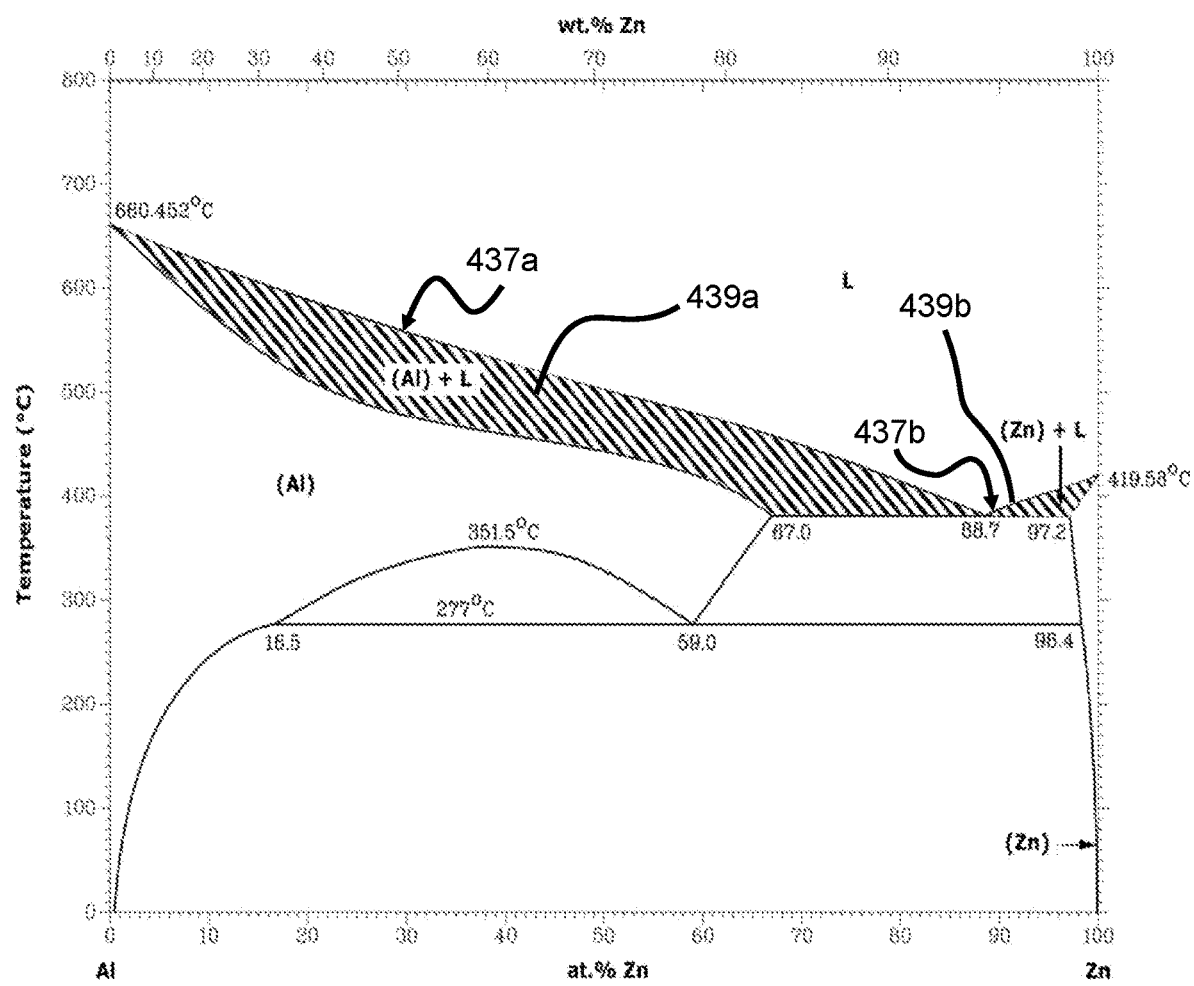
FIG. 4D shows a phase diagram for an aluminum and zinc system.

FIG. 4D shows in graphical form a binary phase diagram for the Al (aluminum) and Zn (zinc) system. The system exhibits a eutectic composition and temperature at 88.7 at % Zn, and 381 degrees C. For composition and temperature combinations within the region denoted L the material will be in a single-phase liquid state. For composition and temperature combinations within the two cross-hatched regions the material will be in a two phase state where liquid and solid phases coexist in equilibrium proportions. In the region 439a, on the left hand side—higher Al concentrations—of the eutectic, the liquid L coexists with the solid (Al) phase and in the region 439b, on the right hand side—higher Zn concentration—of the eutectic composition, the liquid L coexists with the solid (Zn) phase. Where, (Al) denotes a solid solution of Zn in an Al matrix and (Zn) denotes a solid solution of Al in a Zn matrix. The liquidus curves below the liquid region L are indicated at 437*a* bounding the liquid L plus solid (Al) region and at 437*b* bounding the liquid L plus solid (Zn) region.

Figure 6:
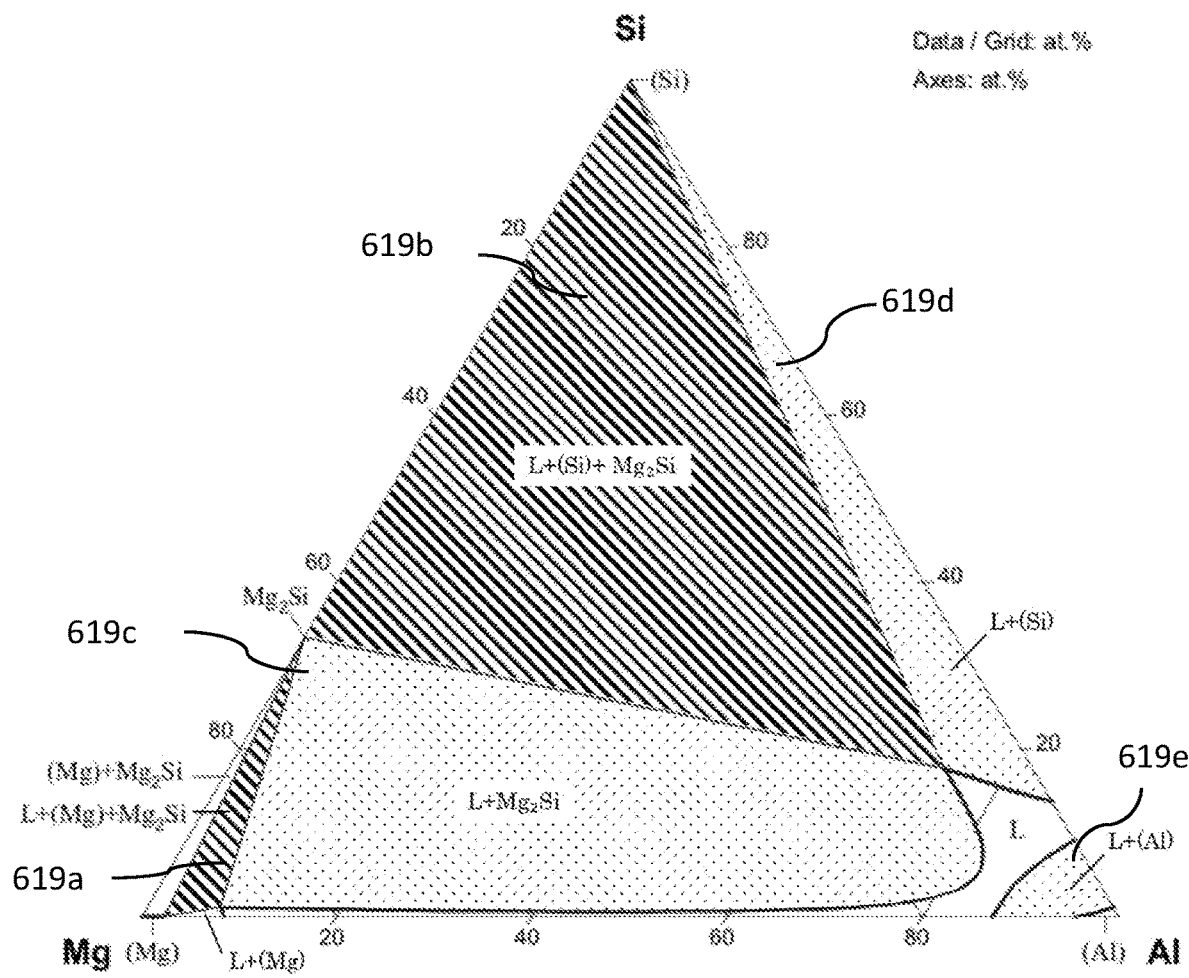
FIG. 6 shows an isothermal section of a phase diagram for an Aluminum Silicon Magnesium Ternary alloy, having regions with a liquid phase and two solid phases.

FIG. 6 shows an isothermal section at 600 degrees C. of the ternary phase diagram for the Al—Si—Mg (aluminum-silicon-magnesium) alloy system. Because there are three components, the phase diagram of the Al—Si—Mg system is three dimensional but at any temperature an isothermal slice of the phase diagram can be constructed that will show the phases present for all compositions of the ternary system. The two cross-hatched regions 619*a* and 619*b* show regions of compositions that have a single liquid phase L, and two different solid phases, with region 619*a* having the solids of (Mg) and Mg$_2$Si, and the other region 619*b* having a liquid phase and the solids of (Si) and Mg$_2$Si. The three dotted regions 619*c*, 619*d* and 619*e* show regions of compositions that have a single liquid phase L, and only one solid phase, but with the solid phases differing in each region, with region 619*c* having the solid of Mg2Si, the region 619*d* having the solid (Si) phase and the other region 619*e* having the solid of (Al). Any of the cross-hatched (liquid and two solid phase) or dotted (liquid and one solid phase) regions could have suitable compositions for multi-phase build material for use with the inventions disclosed herein. Other systems that are ternary, or have even more than three components, may also have the required multi-phase compositions for practice of inventions hereof. The presence of multiphase regions is not limited to binary or ternary systems with a eutectic, it extends to alloy systems with an arbitrary number of components, all of which may exhibit compositions with a working temperature range suitable for fused filament fabrication or similar fabrication processes.

Figure 5A:
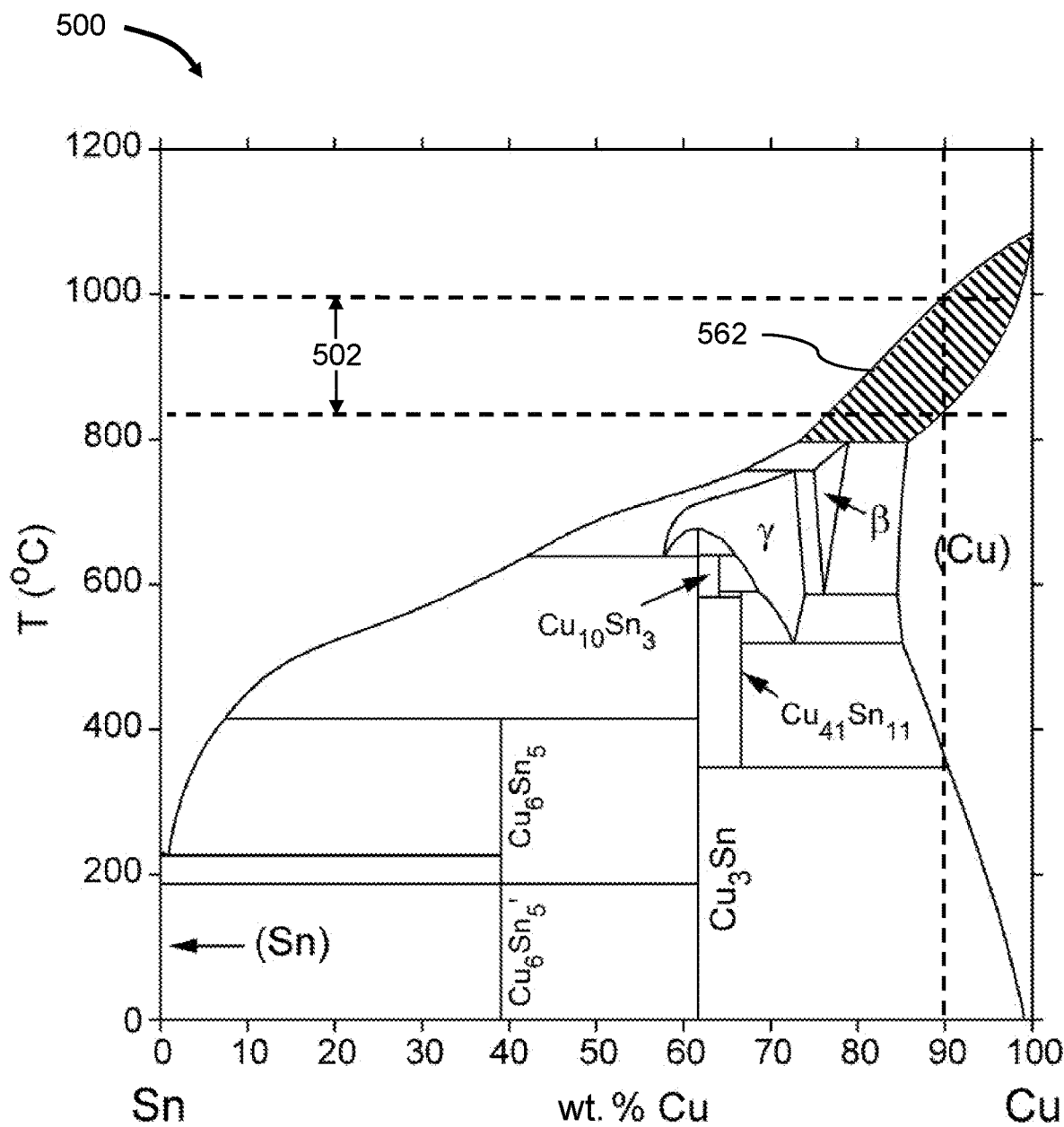
FIG. 5A shows a phase diagram for a peritectic system.

Another instance of suitable MCMP materials may include compositions within a peritectic alloy system. A composition within a peritectic alloy system may also have a working temperature range with a multi-phase state suitable for use in a fused filament fabrication process. FIG. 5A shows a phase diagram 500 for a peritectic system. As used herein, a peritectic system refers to a chemical system wherein a solid phase and a liquid phase may react upon cooling to form a third, solid phase. In particular, FIG. 5A shows a phase diagram 500 for a relatively common peritectic system of 90/10 bronze, which is an alloy of Sn (tin) and Cu (copper). This system can provide a working temperature range 502 in which the constituent elements form a multi-phase mixture between solid and liquid parts, for instance as shown in the cross-hatched region 562. In this range of temperatures, an equilibrium volume fraction of solid and liquid can be controlled by varying temperature. The rheology of the extrudate can be tuned by tuning the volume fraction (and therefore the temperature) of the composition, and the resulting material can provide a substantially plastic temperature behavior suitable for extrusion. While the highly non-uniform solidification behavior may present design and handling challenges, this technique may be usefully applied for fabrication with bronze and similar alloys and materials.

More generally, a suitable MCMP material alloy system may contain more than one eutectic or more than one peritectic, as well as both eutectics and peritectics, all of which may provide a multi-phase state with a rheology suitable for extrusion. For example, the Al—Cu phase diagram (not reproduced herein) has both a eutectic and a peritectic. In particular the presence of intermediate phases and intermetallic compounds can greatly increase the complexity of metal alloy phase diagrams, resulting in multiple regions within the phase diagram where at least one liquid phase and at least one solid phase coexist in equilibrium. In such systems, there may be a wide range of alloy compositions exhibiting a working temperature range with a multi-phase state suitable for use as a metallic build material in a fused filament fabrication process. All of the foregoing are instances of suitable MCMP materials.

Figure 5B:
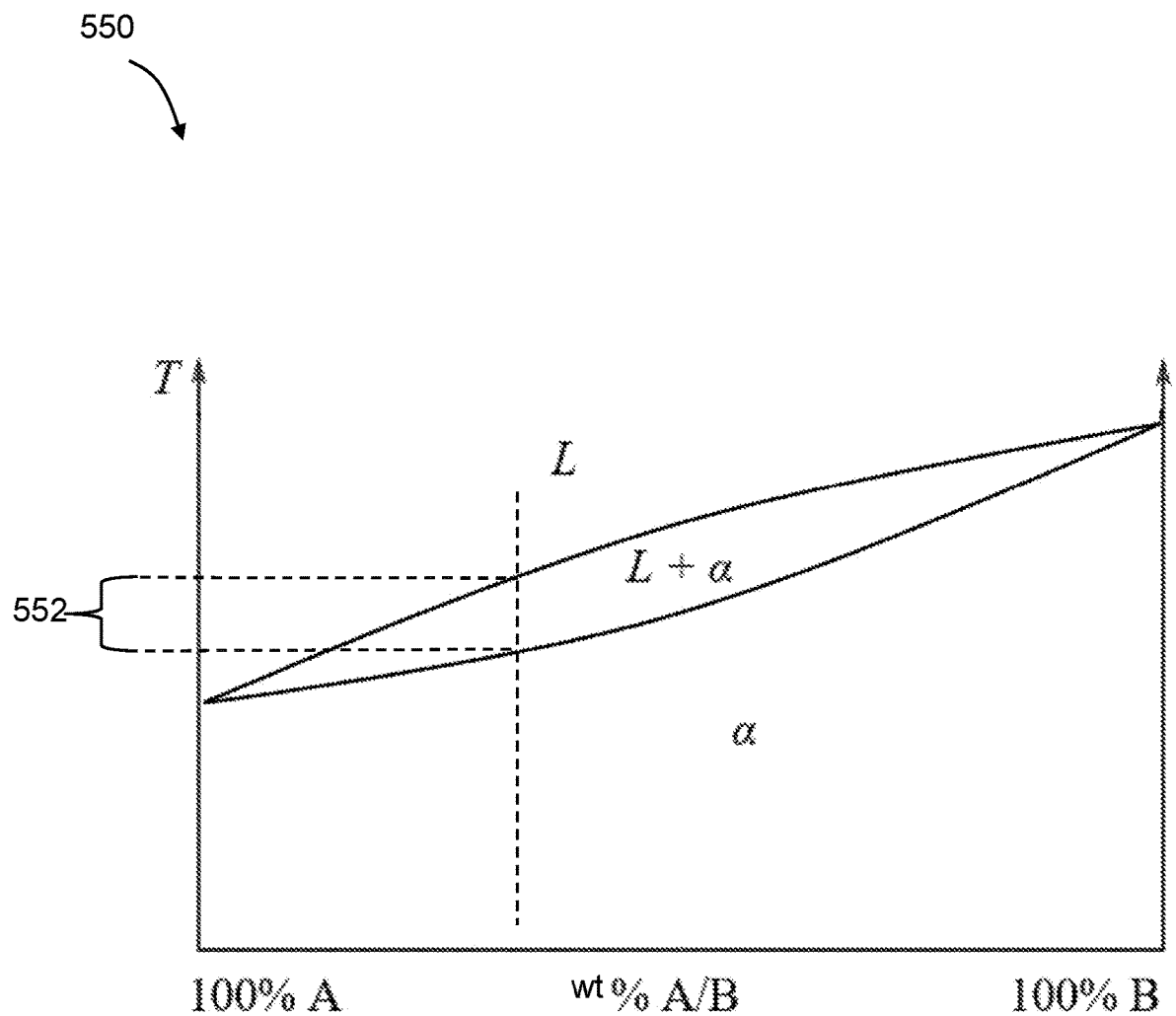
FIG. 5B shows a phase diagram for an isomorphous system.

Yet another instance of suitable MCMP materials are isomorphous alloy systems, for which a portion of a phase diagram is shown schematically in FIG. 5B. A composition of an isomorphous alloy system may also have a working temperature range with a semi-solid state suitable for use in a fused filament fabrication process. Here, an isomorphous alloy system refers to an alloy system comprised of components having the same crystal structure such that the components are fully miscible in the solid state and form a continuous solid solution. Binary alloys of copper and nickel for example represent such an isomorphous alloy system and may be used as a build material for fabricating objects as contemplated herein, particularly in instances in which the composition has a temperature range within which the composition exhibits a mixture of solid and liquid phases resulting in rheological behavior suitable for extrusion.

FIG. 5B shows a phase diagram for an isomorphous system. In particular, FIG. 5B shows a phase diagram 550 for a binary alloy system including component A and B which forms a solid solution a extending across the whole composition range, i.e. from a composition of 100% component A all the way to 100% component B. In certain solid solution forming systems, the solid solubility may have a narrower composition range or ranges than the composition range shown in FIG. 5B without departing from the scope of the present disclosure. The binary solid solution system in FIG. 5B can provide a working temperature range 552 in which the constituent components A and B form a multi-phase mixture between solid and liquid parts. In the temperature range 552, an equilibrium volume fraction of solid and liquid can be controlled by varying temperature. This multi-phase condition may usefully increase viscosity of the material above the pure liquid viscosity while in the temperature range 552 to render the material in a flowable state exhibiting rheological behavior suitable for fused filament fabrication or similar.

More generally, a chemical system may exhibit a multi-phase equilibrium between at least one solid and at least one liquid phase without exhibiting a eutectic or a peritectic phase behavior. The copper-gold system is an example. Such systems may still provide a working temperature range between a solidus and liquidus temperature with a rheology suitable for use in fused filament fabrication process as contemplated herein, and such systems are considered an instance of MCMP materials.

Another instance of suitable MCMP materials include metallic materials using a combination of a metallic base and a high temperature inert second phase, which may constitute a metallic multi-phase material which may be usefully deployed as a build material for fused filament fabrication. For example, U.S. application Ser. No. 15/059, 256, filed on Mar. 2, 2016 and incorporated by reference herein in its entirety, describes a variety of such materials. Thus, one useful metallic build material contemplated herein includes a composite formed of a metallic base and a second phase. The metallic base may include any metal or metal alloy (or combination of alloys) that melts at a first temperature. The second phase may be a high temperature inert second phase in particle form that remains substantially inert up to at least a second temperature that is higher than the first temperature, preferably substantially higher in order to provide a useful working range of temperatures where the metallic base can melt while the second phase remains inert. This second phase may for example include inert ceramic particles. In general, this combination enables the use of a relatively low-temperature metallic alloy as a base material that can be easily melted, while providing a useful working range above the melting temperature where the composite exhibits properties suitable for extrusion or other dispensing operations. As mentioned above, the composite may, within the working temperature range, form a non-Newtonian paste or Bingham fluid with a non-zero shear stress at zero shear strain. While the viscous fluid nature of the composite permits extrusion or other similar deposition techniques, this non-Newtonian characteristic can permit the deposited material to retain its shape against the force of gravity so that a printed object can retain a desired form until the composite material cools below a solidus or eutectic temperature of the metallic base. As a non-limiting example, the metallic base may be a low melting point metal and the second phase may be made up of inert ceramic particles, such that in the working temperature range, this composite forms a paste consisting of solid ceramic particles and molten metal.

In this context, it will be understood that the term inert is intended to mean that a material is not substantially chemically reactive within the relevant temperature range and over the timescales of a printing process, and still more generally that a material remains sufficiently unchanged in physical, chemical and mechanical properties so that the second phase can continue to contribute to the desired properties (e.g., viscosity, yield stress) within the working temperature range. Thus, for example, inert particles in this context will not crystallize, liquefy, oxidize, react, or otherwise interact significantly with other materials in the metallic base, and will not change physical, mechanical, or chemical properties within the composite while within the working temperature range and within the timescales of the printing process. The particles may also or instead be inert as a result of a reacted surface of the particles, or some other surface, coating, condition or property thereof, even when the principal particle material is not inherently inert. A coating could, for example, be a ceramic or intermetallic material. Thus, it is more generally contemplated that within the working temperature range, the metallic base will liquefy, while the second phase will retain its physical characteristics so that the viscosity or yield stress of the composite can be maintained in a range suitable for use in additive manufacturing as contemplated herein.

Another instance of suitable MCMP build materials includes a metal loaded extrudable composite made up of a combination of a matrix material and metal particles. The matrix material may melt or undergo a glass-to-liquid-transition well below the melting temperature of the metal particles and thus provide a working temperature range in which the viscous fluid nature of the composite permits extrusion or other similar deposition techniques. The matrix material may be composed of a multitude of components exhibiting different melting or glass-to-liquid-transition temperatures. As a result, the matrix material may not be fully liquid but rather consist of a mixture of liquid and solid phases in the working temperature range of the composite material. Although such metal loaded extrudable composites may not conventionally be referred to as metallic, and lack many typical bulk properties of a metal (such as good electrical conductivity), a net shape object fashioned from such a material may usefully be sintered into a metallic object, and such a build material—useful for fabricating metallic objects—is considered a "metallic build material" for the purposes of the following discussion. Such composite build materials may contain metallic content such as a sinterable metallic powder or other metal powder mixed with a thermoplastic, a wax, a compatibilizer, a plasticizer, or other material matrix to obtain a metallic build material that can be extruded at low temperatures where the matrix softens (e.g., around two-hundred degrees Celsius or other temperatures well below typical metal melting temperatures). For example, materials such as metal injection molding materials or other powdered metallurgy compositions contain significant metal content, but are workable for extrusion at lower temperatures. These materials, or other materials similarly composed of metal powder and a binder system, may be used to fabricate green parts that can be debound and sintered into fully densified metallic objects, and may be used as metallic build materials as contemplated herein. Other metal-loaded extrudable compositions are described by way of non-limiting example in PCT App. No. PCT/US/17/66526, filed on Dec. 14, 2017, claiming priority to U.S. Provisional application No. 62/434,014 filed on Dec. 14, 2016 and incorporated fully herein by reference, any of which may be suitably employed as a build material as contemplated herein.

Still more generally, describing the overall concept of MCMP materials, they may include any build material with metallic content that provides a useful working temperature range with rheological behavior suitable for heated extrusion and thus may be used as a metallic build material as contemplated herein. Examples have been given above. The limits of this window or range of working temperatures will depend on the type of material (e.g. metal alloy, metallic material with high temperature inert phase, metal-loaded extrudable composites) and the metallic and non-metallic constituents. For metal alloys, such as compositions in eutectic alloy systems, peritectic alloy systems and isomorphous alloy systems, the useful temperature range is typically between a solidus temperature and a liquidus temperature. In this context, the corresponding working temperature range is referred to for simplicity as a working temperature range between a lowest and highest melting temperature. For MCMP build materials with an inert high temperature second phase, the window may begin at any temperature above the melting temperature of the base metallic alloy, and may range up to any temperature where the second phase remains substantially inert within the mixture. For MCMP metal-loaded extrudable composites, the window may begin at any temperature above the glass transition temperature for amorphous matrix materials or above the melting temperature for crystalline matrix materials, and may range up to any temperature where the thermal decomposition of the matrix material remains sufficiently low.

According to the foregoing, the term MCMP build material, as used herein, is intended to refer to any metal-containing build material, which may include elemental or alloyed metallic components, as well as compositions containing other non-metallic components, which may be added for any of a variety of mechanical, rheological, aesthetic, or other purposes. For non-limiting example, non-metallic strengtheners may be added to a metallic material. As another example, a non-metallic material (e.g., plastic, glass, carbon fiber, and so forth) may be imbedded as a support material to reinforce structural integrity of a metallic build material. The presence of a non-metallic support material may be advantageous in many fabrication contexts, such as extended bridging where build material is positioned over large unsupported regions. Moreover, other non-metallic compositions such as sacrificial support materials may be usefully deposited using the systems and methods contemplated herein. Thus, for example, water soluble support structures having high melting temperatures, which are matched to the temperature range (i.e., between the glass transition temperature and melting temperature) of the metallic build material can be included within the printed product. All such materials and compositions used in fabricating a metallic object, either as constituents of the metallic object or as supplemental materials used to aid in the fabrication of the metallic object, are intended to fall within the scope of a MCMP build material as contemplated herein, suitable for use with inventions discussed herein.

Much of the discussion above contemplates alloys of two or three elements. However, the MCMP materials contemplated herein may also or instead include alloy systems or combinations of alloy systems with any number of elements. Examples of commercial alloys which are relevant include the following: Zinc die-casting alloys such as Zamak 2, Zamak 3, Zamak 5, Zamak 7, ZA-8, ZA-12, ZA-27; Magnesium die casting alloys such as AZ91, Aluminum casting alloys such as A356, A357, A319, A360, A380; and Aluminum wrought alloys such as 6061, 7075.

Now that suitable build materials for use with inventions hereof have been described, it is useful to return to a more detailed discussion of apparatus and methods used to treat and build objects with such build materials. FIG. 1 is a block diagram of an additive manufacturing system. In general, the additive manufacturing system may include a three-dimensional printer 101 (or simply 'printer' 101) that deposits a metal, metal alloy, metal composite or the like using fused filament fabrication or any similar process. In general, the printer 101 may include a build material 102 that is propelled by a drive system 104 and heated to an extrudable state by a heating system 106, and then extruded through one or more nozzles 110. By concurrently controlling robotics 108 to position the nozzle(s) along an extrusion path relative to a build plate 114, an object 112 may be fabricated on the build plate 114 which may be situated within a build chamber 116. In general, a control system 118 may manage operation of the printer 101 to fabricate the object 112 according to a three-dimensional model using a fused filament fabrication process or the like.

The build material 102 may be provided in a variety of form factors including, without limitation, any of the form factors described herein or in materials incorporated by reference herein. The build material 102 may be provided, for example, from a hermetically sealed container or the like (e.g., to mitigate passivation), as a continuous feed (e.g., a wire), or as discrete objects such as rods or rectangular prisms that can be fed into a chamber or the like as each prior discrete unit of build material 102 is heated and extruded. In one aspect, two build materials 102 may be used concurrently, e.g., through two different nozzles, where one nozzle is used for general fabrication and another nozzle is used for bridging, supports, or similar features.

The build material 102 may include a metal wire, such as a wire with a diameter of approximately 80 μm, 90 μm, 100 μm, 0.5 mm, 1 mm, 1.25 mm, 1.5 mm, 1.75 mm, 2 mm, 2.25 mm, 2.5 mm, 3 mm, or any other suitable diameter.

The build material 102 may have any shape or size suitable for extrusion in a fused filament fabrication process. For example, the build material 102 may be in pellet form for heating and compression, or the build material 102 may be formed as a wire (e.g., on a spool), a billet, or the like for feeding into an extrusion process.

A printer 101 disclosed herein may include a first nozzle 110 for extruding a first material. The printer 101 may also include a second nozzle for extruding a second material, where the second material has a supplemental function (e.g., as a support material or structure) or provides a second build material with different mechanical, functional, or aesthetic properties useful for fabricating a multi-material object.

A drive system 104 may include any suitable gears, rollers, compression pistons, or the like for continuous or indexed feeding of the build material 102 into the heating system 106. In one aspect, the drive system 104 may include a gear such as a spur gear with teeth shaped to mesh with corresponding features in the build material such as ridges, notches, or other positive or negative detents. In another aspect, the drive system 104 may use heated gears or screw mechanisms to deform and engage with the build material. Thus, in one aspect a printer for a metal FFF process may heat a metal to a temperature within a working temperature range for extrusion, and heat a gear that engages with, deforms, and drives the metal in a feed path toward the nozzle 110.

In another aspect, the drive system 104 may use bellows or any other collapsible or telescoping press to drive rods, billets, or similar units of build material into the heating system 106. Similarly, a piezoelectric or linear stepper drive may be used to advance a unit of build media in an indexed fashion using discrete mechanical increments of advancement in a non-continuous sequence of steps.

The heating system 106 may employ a variety of techniques to heat a metallic build material to a temperature within a working temperature range suitable for extrusion. For fused filament fabrication systems as contemplated herein, this is more generally a range of temperatures where a build material exhibits rheological behavior suitable for fused filament fabrication or a similar extrusion-based process. These properties are generally appreciated for, e.g., thermoplastics such as ABS or PLA used in fused deposition modeling, however many metallic build materials have similarly suitable properties, albeit many with greater forces and higher temperatures, for heating, deformation and flow through a nozzle so that they can be deposited onto an object with a force and at a temperature to fuse to an underlying layer. Among other things, this requires a plasticity at elevated temperatures that can be propelled through a nozzle for deposition (at time scales suitable for three-dimensional printing), and a rigidity at lower temperatures that can be used to transfer force downstream in a feedpath to a nozzle bore or reservoir where the build material can be heated into a flowable state and forced out of a nozzle.

Any heating system 106 or combination of heating systems suitable for maintaining a corresponding working temperature range in the build material 102 where and as needed to drive the build material 102 to and through the nozzle 110 may be suitably employed as a heating system 106 as contemplated herein. In one aspect, electrical techniques such as inductive or resistive heating may be usefully applied to heat the build material 102. Thus, for example, the heating system 106 may be an inductive heating system or a resistive heating system configured to electrically heat a chamber around the build material 102 to a temperature within the working temperature range, or this may include a heating system such as an inductive heating system or a resistive heating system configured to directly heat the material itself through an application of electrical energy. Because metallic build materials are generally electrically conductive, they may be electrically heated through contact methods (e.g., resistive heating with applied current) or non-contact methods (e.g., induction heating using an external electromagnet to drive eddy currents within the material). When directly heating the build material 102, it may be useful to model the shape and size of the build material 102 in order to better control electrically-induced heating. This may include estimates or actual measurements of shape, size, mass, and so forth, as well as information about bulk electromagnetic properties of the build material 102. The heating system 106 may also include various supplemental systems for locally or globally augmenting heating using, e.g., chemical heating, combustion, laser heating or other optical heating, radiant heating, ultrasound heating, electronic beam heating, and so forth.

The robotics 108 may include any robotic components or systems suitable for moving the nozzles 110 in a three-dimensional path relative to the build plate 114 while extruding build material 102 to fabricate the object 112 from the build material 102 according to a computerized model of the object. A variety of robotics systems are known in the art and suitable for use as the robotics 108 contemplated herein. For example, the robotics 108 may include a Cartesian coordinate robot or x-y-z robotic system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of a nozzle 110 relative to the build plate 114 may be usefully employed, including any mechanism or combination of mechanisms suitable for actuation, manipulation, locomotion, and the like within the build chamber 116.

The robotics 108 may position the nozzle 110 relative to the build plate 114 by controlling movement of one or more of the nozzle 110 and the build plate 114. For example, in an aspect, the nozzle 110 is operably coupled to the robotics 108 such that the robotics 108 position the nozzle 110 while the build plate 114 remains stationary. The build plate 114 may also or instead be operably coupled to the robotics 108 such that the robotics 108 position the build plate 114 while the nozzle remains stationary. Or some combination of these techniques may be employed, such as by moving the nozzle 110 up and down for z-axis control, and moving the build plate 114 within the x-y plane to provide x-axis and y-axis control. In some such implementations, the robotics 108 may translate the build plate 114 along one or more axes, and/or may rotate the build plate 114.

The object 112 may be any object suitable for fabrication using the techniques contemplated herein. This may include functional objects such as machine parts, aesthetic objects such as sculptures, or any other type of objects, as well as combinations of objects that can be fit within the physical constraints of the build chamber 116 and build plate 114. Some structures such as large bridges and overhangs cannot be fabricated directly using FFF because there is no underlying physical surface onto which a material can be deposited. In these instances, a support structure 113 may be fabricated, preferably of a soluble or otherwise readily removable material, in order to support a corresponding feature. Alternatively, support structure can be made of the same material as the build material, but presented in a skeletal geometry, which can be cut off later.

The build plate 114 may be formed of any surface or substance suitable for receiving deposited metal or other materials from the nozzles 110. The surface of the build plate 114 may be rigid and substantially planar. In one aspect, the build plate 114 may be heated, e.g., resistively or inductively, to control a temperature of the build chamber 116 or a surface upon which the object 112 is being fabricated. This may, for example, improve adhesion, prevent thermally induced deformation or failure, and facilitate relaxation of stresses within the fabricated object. In another aspect, the build plate 114 may be a deformable structure or surface that can bend or otherwise physically deform in order to detach from a rigid object 112 formed thereon. The build plate 114 may also include electrical contacts providing a circuit path for internal ohmic heating of the object 112 or heating an interface between the object 112 and build material 102 exiting the nozzle 110.

The build plate 114 may be movable within the build chamber 116, e.g., by a positioning assembly (e.g., the same robotics 108 that position the nozzle 110 or different robotics). For example, the build plate 114 may be movable along a z-axis (e.g., up and down—toward and away from the nozzle 110), or along an x-y plane (e.g., side to side, for instance in a pattern that forms the tool path or that works in conjunction with movement of the nozzle 110 to form the tool path for fabricating the object 112), or some combination of these. In an aspect, the build plate 114 is rotatable.

The build plate 114 may include a temperature control system for maintaining or adjusting a temperature of at least a portion of the build plate 114. The temperature control system may be wholly or partially embedded within the build plate 114. The temperature control system may include without limitation one or more of a heater, coolant, a fan, a blower, or the like. In implementations, temperature may be controlled by induction heating of the metallic printed part.

In general, an optional build chamber 116 houses the build plate 114 and the nozzle 110, and maintains a build environment suitable for fabricating the object 112 on the build plate 114 from the build material 102. Where appropriate for the build material 102, this may include a vacuum environment, an oxygen depleted environment, a heated environment, and inert gas environment, and so forth. A build chamber is an optional element. It is not required for all situations. Some materials may require a special build environment inside a build chamber, such as an inert gas atmosphere. Other materials such as zinc aluminum alloys or zinc die casting alloys may be printed in air and thus do not require a build chamber. The build chamber 116, if present, may be any chamber suitable for containing the build plate 114, an object 112, and any other components of the printer 101 used within the build chamber 116 to fabricate the object 112. There are many places within this disclosure that mention a build chamber, and it should be understood that it is optional, in general, and that it has been mentioned only because in many cases, it is used, and to mention it shows all of the elements that might be present in any one situation.

The printer 101 may include a vacuum pump 124 coupled to the build chamber 116 and operable to create a vacuum within the build chamber 116. The build chamber 116 may form an environmentally sealed chamber so that it can be evacuated with the vacuum pump 124 or any similar device in order to provide a vacuum environment for fabrication. This may be particularly useful where oxygen causes a passivation layer that might weaken layer-to-layer bonds in a fused filament fabrication process as contemplated herein. The build chamber 116 may be hermetically sealed, air-tight, or otherwise environmentally sealed. The environmentally sealed build chamber 116 can be purged of oxygen, or filled with one or more inert gases in a controlled manner to provide a stable build environment. Thus, for example, the build chamber 116 may be substantially filled with one or more inert gases such as argon or any other gases that do not interact significantly with heated metallic build materials 102 used by the printer 101. One or more passive or active oxygen getters 126 or other similar oxygen absorbing materials or systems may usefully be employed within the build chamber 116 to take up free oxygen. The build chamber 116 may include a temperature control system 128 for maintaining or adjusting a temperature of at least a portion of a volume of the build chamber 116 (e.g., the build volume). The temperature control system 128 may also or instead move air (e.g., circulate air) within the build chamber 116 to control temperature, to provide a more uniform temperature, or to transfer heat within the build chamber 116.

In general, a control system 118 may include a controller or the like configured to control operation of the printer 101. The control system 118 may be operable to control the components of the additive manufacturing system 100, such as the nozzle 110, the build plate 114, the robotics 108, the various temperature and pressure control systems, and any other components of the additive manufacturing system 100 described herein to fabricate the object 112 from the build material 102 based on a three-dimensional model 122 or any other computerized model describing the object 112. The control system 118 may include any combination of software and/or processing circuitry suitable for controlling the various components of the additive manufacturing system 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the control system 118 may include a microprocessor or other processing circuitry with sufficient computational power to provide related functions such as executing an operating system, providing a graphical user interface (e.g., to a display coupled to the control system 118 or printer 101), converting three-dimensional models 122 into tool instructions, and operating a web server or otherwise hosting remote users and/or activity through a network interface 162 for communication through a network 160.

In general, a three-dimensional model 122 or other computerized model of the object 112 may be stored in a database 120 such as a local memory of a computing device used as the control system 118, or a remote database accessible through a server or other remote resource, or in any other computer-readable medium accessible to the control system 118. The control system 118 may retrieve a particular three-dimensional model 122 in response to user input, and generate machine-ready instructions for execution by the printer 101 to fabricate the corresponding object 112. This may include the creation of intermediate models, such as where a CAD model is converted into an STL model, or other polygonal mesh or other intermediate representation, which can in turn be processed to generate machine instructions such as g-code for fabrication of the object 112 by the printer 101.

In operation, to prepare for the additive manufacturing of an object 112, a design for the object 112 may first be provided to a computing device 164. The design may be a three-dimensional model 122 included in a CAD file or the like. The computing device 164 may in general include any devices operated autonomously or by users to manage, monitor, communicate with, or otherwise interact with other components in the additive manufacturing system 100. This may include desktop computers, laptop computers, network computers, tablets, smart phones, smart watches, or any other computing device that can participate in the system as contemplated herein. In one aspect, the computing device 164 is integral with the printer 101.

The computing device 164 may include the control system 118 as described herein or a component of the control system 118. The computing device 164 may also or instead supplement or be provided in lieu of the control system 118. Thus, unless explicitly stated to the contrary or otherwise clear from the context, any of the functions of the computing device 164 may be performed by the control system 118 and vice-versa. In another aspect, the computing device 164 is in communication with or otherwise coupled to the control system 118, e.g., through a network 160, which may be a local area network that locally couples the computing device 164 to the control system 118 of the printer 101, or an internetwork such as the Internet that remotely couples the computing device 164 in a communicating relationship with the control system 118.

The computing device 164 (and the control system 118) may include a processor 166 and a memory 168 to perform the functions and processing tasks related to management of the additive manufacturing system 100 as described herein. In general, the memory 168 may contain computer code that can be executed by the processor 166 to perform the various steps described herein, and the memory may further store data such as sensor data and the like generated by other components of the additive manufacturing system 100.

One or more ultrasound transducers 130 or similar vibration components may be usefully deployed at a variety of locations within the printer 101. For example, a vibrating transducer may be used to media as it is distributed from a hopper of build material 102 into the drive system 104. The printer 101 may also include a camera 150 or other optical device. In one aspect, the camera 150 may be used to create the digital twin 140 or provide spatial data for the digital twin 140. The camera 150 may more generally facilitate machine vision functions or facilitate remote monitoring of a fabrication process. The additive manufacturing system 100 may include one or more sensors 170. The sensor 170 may communicate with the control system 118, e.g., through a wired or wireless connection (e.g., through a data network 160). The sensor 170 may be configured to detect progress of fabrication of the object 112, and to send a signal to the control system 118 where the signal includes data characterizing progress of fabrication of the object 112. The additive manufacturing system 100 may include, or be connected in a communicating relationship with, a network interface 162. The network interface 162 may include any combination of hardware and software suitable for coupling the control system 118 and other components of the additive manufacturing system 100 in a communicating relationship to a remote computer (e.g., the computing device 164) through a data network 160. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to a local area network or the like that is in turn coupled to a wide area data network such as the Internet. This may also or instead include hardware/ software for a WiMAX connection or a cellular network connection (using, e.g., CDMA, GSM, LTE, or any other suitable protocol or combination of protocols). Consistently, the control system 118 may be configured to control participation by the additive manufacturing system 100 in any network 160 to which the network interface 162 is connected, such as by autonomously connecting to the network 160 to retrieve printable content, or responding to a remote request for status or availability of the printer 101.

FIG. 2 is a block diagram of a computer system, which may be used for any of the computing devices, control systems or other processing circuitry described herein. The computer system 200 may include a computing device 210, which may also be connected to an external device 204 through a network 202. The computing device 210 may include any of the controllers described herein (or vice-versa), or otherwise be in communication with any of the controllers or other devices described herein. The computing device 210 may include a processor 212, a memory 214, a network interface 216, a data store 218, and one or more input/output devices 220. The computing device 210 may further include or be in communication with peripherals 222. A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth. A bus 232 or combination of busses may serve as an electromechanical platform for interconnecting components of the computing device 200.

FIG. 3 shows an extruder 300 for a three-dimensional printer. In general, the extruder 300 may include a nozzle 302, a nozzle bore 304, a heating system 306, and a drive system 308 such as any of the systems described herein, or any other devices or combination of devices suitable for a printer that fabricates an object from a computerized model using a fused filament fabrication process and a metallic build material as contemplated herein. In general, the extruder 300 may receive a build material 310 from a source 312, such as any of the build materials and sources described herein, and advance the build material 310 along a feed path (indicated generally by an arrow 314) toward an opening 316 of the nozzle 302 for deposition on a build plate 318 or other suitable surface. The term build material is used herein interchangeably to refer to metallic build material, species and combinations of metallic build materials, or any other build materials (such as thermoplastics). As such, references to "build material 310" should be understood to include metallic build materials, or multi-phase metallic build materials or any of the other build material or combination of build materials described herein, including a thermoplastic, under specific conditions, unless a more specific meaning is provided or otherwise clear from the context.

The nozzle 302 may be any nozzle suitable for the temperatures and mechanical forces required for the build material 310. For extrusion of metallic build materials, portions of the nozzle 302 (and the nozzle bore 304) may be formed of high-temperature materials such as sapphire, alumina, aluminum nitride, graphite, boron nitride or quartz, which provide a substantial margin of safety for system components.

The nozzle bore 304 may be any chamber or the like suitable for heating the build material 310, and may include an inlet 305 to receive a build material 310 from the source 312. The nozzle 302 may also include an outlet 316 that provides an exit path for the build material 310 to exit the nozzle bore 304 along the feed path 314 where, for example, the build material 310 may be deposited on the build plate 318. The inside dimensions of the nozzle bore may be larger than the outside dimensions of the incoming build material, and thus could be said to have some amount of clearance or extra volume with respect the build material. It should also be noted that the nozzle bore may take a wide array of geometries and cross-sections and need not be uniform along its length. For example, it may include diverging sections, converging sections, straight sections, and non-cylindrical sections. Subsequent layers of lines are deposited upon an earlier layer 340. The layer presently being deposited as the top layer 390 has an exposed upper surface 372, upon which the nest to be deposited layer will be deposited.

The heating system 306 may employ any of the heating devices or techniques described herein. It will be understood that the heating system 306 may also or instead be configured to provide additional thermal control, such as by locally heating the build material 310 where it exits the nozzle 302 or fuses with a second layer 392 of previously deposited material, or by heating a build chamber or other build environment where the nozzle 302 is fabricating an object. An auxiliary heater (not shown) may be provided relatively close to the inlet 305, for times when it may be desired to heat add thermal power to the nozzle near to the inlet.

The drive system 308 may be any drive system operable to mechanically engage the build material 310 in solid form and advance the build material 310 from the source 312 into the nozzle bore 304 with sufficient force to extrude the build material 310, while at a temperature within the working temperature range, through the opening 316 in the nozzle 302. In general, the drive system 308 may engage the build material 310 while at a temperature below the working temperature range, e.g., in solid form, or at a temperature below a bottom of the working temperature range where the build material 310 is more pliable but still sufficiently rigid to support extrusion loads and translate a driving force from the drive system 308 through the build material 310 to extrude the heated build material in the nozzle bore 304. A sensor 328, such as a load cell or a torque sensor, may be coupled to the drive system 308, to sense the load on the drive system. This can be useful, for instance, to determine whether any blockages or other impediments to driving the build material may be occurring.

Unlike thermoplastics conventionally used in fused filament fabrication, metallic build materials are highly thermally conductive. As a result, high nozzle temperatures can contribute to elevated temperatures in the drive system 308. Thus, in one aspect, a lower limit of the working temperature range for the nozzle bore 304 and nozzle 302 may be any temperature within the temperature ranges described above that is also above a temperature of the build material 310 where it engages the drive system 308, thus providing a first temperature range for driving the build material 310 and a second temperature range greater than the first temperature range for extruding the build material 310. Or stated alternatively and consistent with the previously discussed working temperature ranges, the build material 310 may typically be maintained within the working temperature range while extruding and below the working temperature range while engaged with the drive system 308, however, in some embodiments the build material 310 may be maintained within the working temperature when engaged with the drive system 308 and when subsequently extruded from by the nozzle 302. All such temperature profiles consistent with extrusion of metallic build materials as contemplated herein may be suitably employed. While illustrated as a gear, it will be understood that the drive system 308 may include any of the drive chain components described herein, and the build material 310 may be in any suitable, corresponding form factor.

A camera 352, may be provided to observe the condition of the build material 310 adjacent and outside of the nozzle inlet 305.

The extruder 300 may also include a controller 360, for controlling various components of the extruder, such as a camera1 352, load sensor 328, sensor 350, and the ultrasound generator 130, among other things.

As noted above, a printer may include two or more nozzles and extruders for supplying multiple build and support materials or the like. Thus, the extruder 300 may be a second extruder for extruding a supplemental build material.

Figure 7:
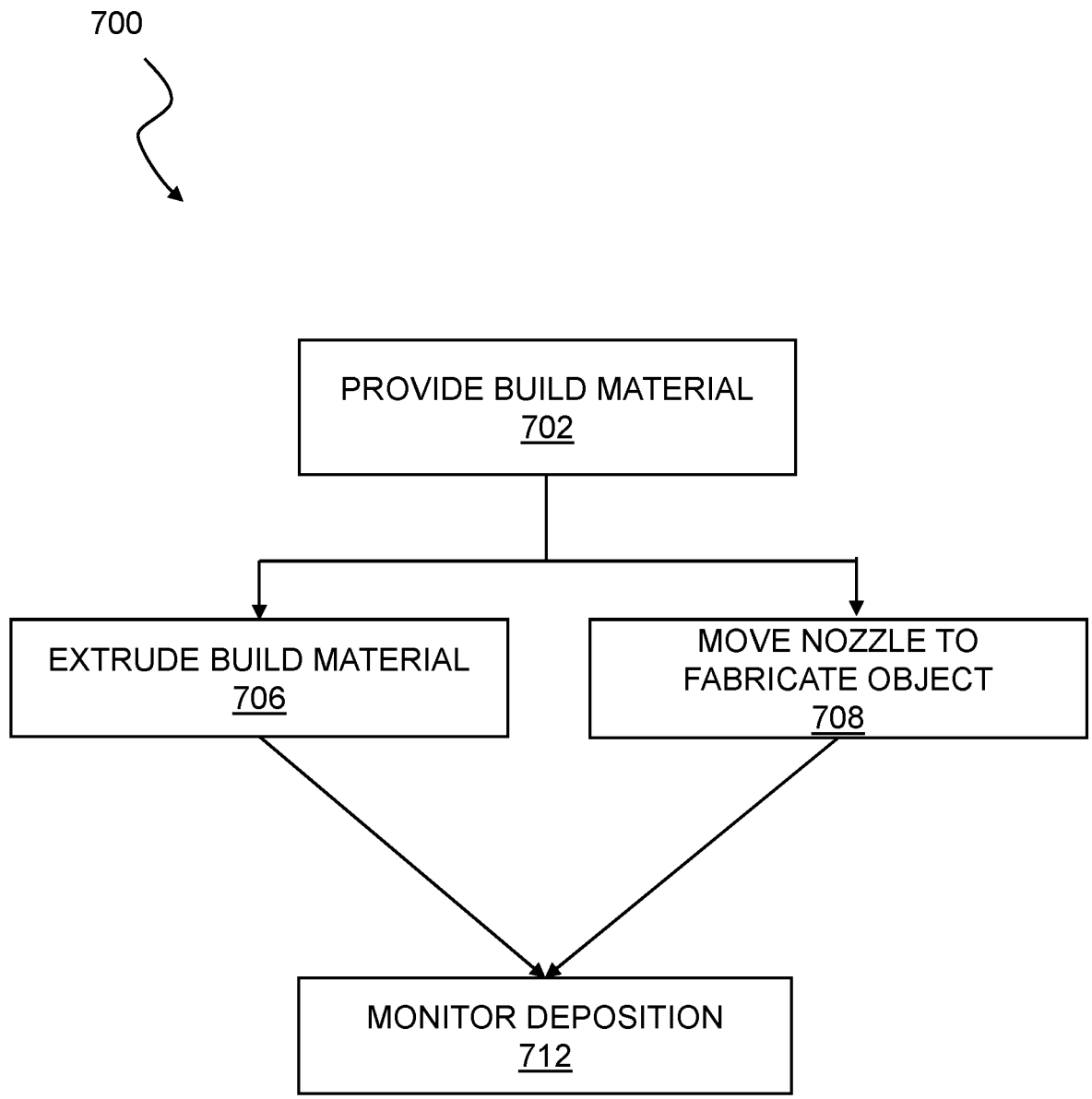
FIG. 7 shows a flow chart of a method for operating a printer in a three-dimensional fabrication of an object.

FIG. 7 shows schematically, in flow chart form, the steps of a method for operating a printer in a three-dimensional fabrication of an object.

As shown in step 702, the method 700 may begin with providing a build material such as any of the build materials described herein to an extruder.

Simultaneously, build material is extruded 706 and the nozzle outlet is moved 708, relative to the build plate, to deposit lines of extruded build material, to fabricate an object. In some circumstances, it is beneficial to monitor 712 feeding and/or deposition of the build material, for instance with a camera 150 (FIG. 1) or 352 (FIG. 3), or a force sensor 328 (FIG. 1), as discussed below. A camera, such as 352 could be provided near to the inlet 305 of the nozzle, where it could observe the geometrical condition of the build material as it is being driven into the nozzle. For instance, if the build material is in the form of a wire, and if the wire buckles, that may indicate that there is blockage or some other impediment to the flow of build material through the extruder 300. In such a case, remedial action could be taken. Alternatively, if the diameter of the build material immediately adjacent the inlet 305 to the nozzle increases, in a phenomenon that may be referred to a mushrooming, that might indicate that the softened build material is deforming, because there is an impediment to it proceeding into the nozzle bore 304. Again, remedial action could be taken, as discussed below.

The foregoing has described generally 3D printing build materials that are MCMP, and also general aspects of 3D printing with typical hardware. Below will be described a thermally robust nozzle, that is both heated and cooled to a significant degree, and methods of using such a thermally robust nozzle to print using MCMP build materials, as well as thermoplastic build materials. By robust, it is meant that such a nozzle delivers consistent thermal performance even while the conditions of operation change. Examples of changes in conditions of operation include, but are not limited to: changes in the rate of extrusion; contact to and separation from the part being built; changes in the thermal loading imposed by the part being built as the geometry and the temperature change; and changes in ambient conditions of temperature, air velocity and other factors. Without the present inventions, changes in conditions of operation would result in changes in temperature and temperature profile within the nozzle, which could only be compensated for using techniques from control theory. Such techniques are helpful, but suffer from delay in response and inaccuracies due to imprecise models. With the present inventions, a nozzle acquires a degree of inherent stability of the temperature and temperature profile that is operative, even without the application of control theory and associated technology. The additional application of control theory can further improve the thermal stability.

Further developing the concept of thermally robust, it is meant that the temperature of the nozzle, at individual locations, such as its inlet or its outlet, and at locations along its axial length (i.e. along the primary direction of build material flow), will substantially resist the effects of transients in motion of the build material through the nozzle, such as starting and stopping, and accelerations and decelerations in build material feed rate. Such a nozzle can maintain a target temperature at the outlet, and also a range of target temperatures, that constitute a target temperature profile, over an axial extent of the nozzle. It will be understood that a thermally robust nozzle may be used in conjunction with one or more of the systems, devices, methods, techniques, processes, and materials described herein, such as those discussed with reference to FIGS. 1-3 described above. Also described below is a thermally robust nozzle in which an essentially singular target nozzle bore temperature can be maintained. For such a nozzle, only this one temperature is important, and may not employ an axial temperature profile. An example of such a nozzle is shown schematically with reference to FIG. 13. Several embodiments of thermally robust nozzles for use with 3D Printing will now be described In this disclosure, heat is used to mean thermal energy, and is measured in the SI derived system in Joules. Thermal power refers to the movement or transfer of heat thermal energy, on a per unit time basis, from one location to another. The SI derived unit of thermal power is a Joule per second, or Watt. The term extrudate refers to the build material that is exiting a nozzle, e.g., in a three-dimensional printing process. The terms filament and build material are used interchangeably.

In a typical fused filament fabrication (FFF) process, a thermoplastic polymeric filament of build material is fed into a heated, cylindrical, tubular structure where it is heated so that its viscosity decreases, and then it is pushed out of a nozzle where it adds to a part being built. The filament thus acts as the source of the new material, but it also may act as the piston that creates the pressure that pushes softened material out of the nozzle. The filament should sustain enough strength and stability under compression to act as a piston over a temperature range from ambient temperature up to the transition zone in the nozzle where the material transitions from solid to a flowable state with rheological behavior suitable for extrusion.

While it is possible and practical to process a thermoplastic filament in this manner, the thermo-mechanical properties of metals are dramatically different than those of plastics, and hence, the approaches used in FFF of plastics may not be suitable to use when metal filament is fed into an extruder. For example, there may be differences in rheological properties, useful temperature ranges, specific heat, heat of fusion and thermal conductivity.

Beginning with rheological considerations, thermoplastics typically have a wide temperature range over which they can be extruded, because they have a wide temperature range over which an increase in temperature leads to a progressive decrease in viscosity. This characteristic is widely used in processing thermoplastics by thermoforming, injection molding, transfer molding, roto-molding, and extrusion, as is known in the art of polymer processing. Due do this property, in FFF, the temperature of the plastic upon exit from the nozzle can vary somewhat without a major impact on the process. However, metals typically have a definite temperature at which they melt, or begin to melt. As soon as metal melts, it may turn from a solid to a liquid of relatively low viscosity (1-10 centipoise). The low viscosity of a metal melt may lead to a difficulty in that, once extruded, the geometry of the newly extruded bead or line may be difficult to control. Furthermore, many of the rheological properties are relatively sensitive with respect to temperature within the operating temperature range. For example, in some alloy systems the fraction of the solid phase in the multi-phase region may go from approximately 50 atomic percentage (at %) to 0 at % over just 50 degrees C.

Further complicating the matter for the extrusion of metal, the high specific heat of metals and the high heat of fusion of metal, can mean that comparably more energy must be added to condition it to the desired temperature range. For example, consider the case of the extrusion of an ABS filament versus the extrusion of aluminum—the aluminum may require over five times more energy input to fully melt the metal, as compared to energy required to melt the ABS on a per unit volume basis. Thus, if filament of the same diameter is extruded at the same rate, the metallic filament may require over five times more thermal power input than the plastic filament. Thus, with metals, there is generally a need for tighter temperature control even while having much higher power demands—a factor that tends to make temperature control even more challenging.

In addition to a desire for tighter temperature control, even in the presence of high thermal powers, metals may pose yet another challenge as the thermal conductivity of metals is generally dramatically higher than that of polymers. As a consequence, thermal power may conduct back from the transition zone inside the nozzle bore 304 along the build material filament. Along with the potential thermal disturbance to the nozzle, this may make it more difficult to maintain the filament to be cool enough to act as the piston and mechanically drive the build material through a nozzle during extrusion. Furthermore, there are additional challenges when considering the dynamic case of varying build material feed rates. In part due to their high thermal conductivities, metallic build materials tend to have higher thermal diffusivities than polymeric build materials traditionally used in FFF, with the thermal diffusivity for a metallic build material being potentially two or three orders of magnitude higher. Thus these materials may conduct significantly more heat through a filament (or other build material form factor) than is stored per unit volume in the metallic build materials, as compared to polymeric build materials with the same dimensions and same feed rates. Not only is the amount of thermal power conducted back along the filament and away from the nozzle higher, but the rate at which the heat diffuses is also higher. This poses a more dynamic control challenge, as the temperature of the build material being presented to the nozzle will more heavily depend on the time-history of the build material feed rate. Thus, the temperature control of the filament in the printing of metals is more difficult than the printing of polymers.

Thus for the aforementioned reasons, when processing metals, it is beneficial to control the temperature of the extruded metal with particularly high accuracy to attain the proper rheological behavior for FFF even though that may be difficult, especially when considering changes in the speed of the extrusion.

A degree of temperature control of the extrudate may be maintained by control methods known in the art. For example, feedback control based on a temperature measurement and/or feedforward control based on the volume flow rate of the filament may be employed. However, the effectiveness of these methods may be limited by the propagation rate of thermal power through the nozzle body (i.e. transport delay). For example, in both feedback and feedforward, increased heater thermal power must propagate from the heated portion of the nozzle to the filament itself. Rapid disturbances, such as starting and stopping extrusion, may pose particular control challenges. Such control can be provided by the controller 330, or other controller apparatus, as is understood in the art.

The current teachings may achieve advantageous temperature control in this environment by flowing a large amount of thermal power through the nozzle body on a continual basis, and substantially concurrently withdrawing a smaller, but also substantial amount of thermal power at another location. The amount of this thermal power removed (and thus, necessarily, added) may be relatively large compared to the amount of thermal power needed to condition the incoming build material to the requisite rheological behavior. For example, if at a significant extrusion rate, a steady state thermal power of 60 W is required to heat and condition the build material filament, a steady state thermal power of at least 30 W (and more preferably 60 W, and even more preferably at least 120 W and even more preferably, 300 W) may be flowed through the nozzle body and subsequently deliberately removed. This is just one example. An example analysis of temperature change of a nozzle to a change in extrusion rate, with extra thermal power flow present, will now be discussed with reference to schematic diagram FIG. 8. The model generally assumes heating (adding thermal power) and cooling (removing thermal power) are done open loop, and investigates temperature response of a nozzle to a disturbance, including the change in filament build material feed rate. This model generally assumes the nozzle body is of high thermal conductance and the locations at which thermal power is added and thermal power is removed are relatively close to one another, (such as shown schematically also with reference to FIG. 13 discussed in more detail below) so that the entire nozzle body can be considered to be at a single temperature. The purpose is to demonstrate that even in this simple case, the maintenance of a high flow of thermal power through the nozzle body is advantageous to temperature control. Put differently, the purpose is to demonstrate that arranging that the thermal power removed from the nozzle body be comparable to or larger than the thermal power required to condition the material, is advantageous to temperature control.

Figure 8:
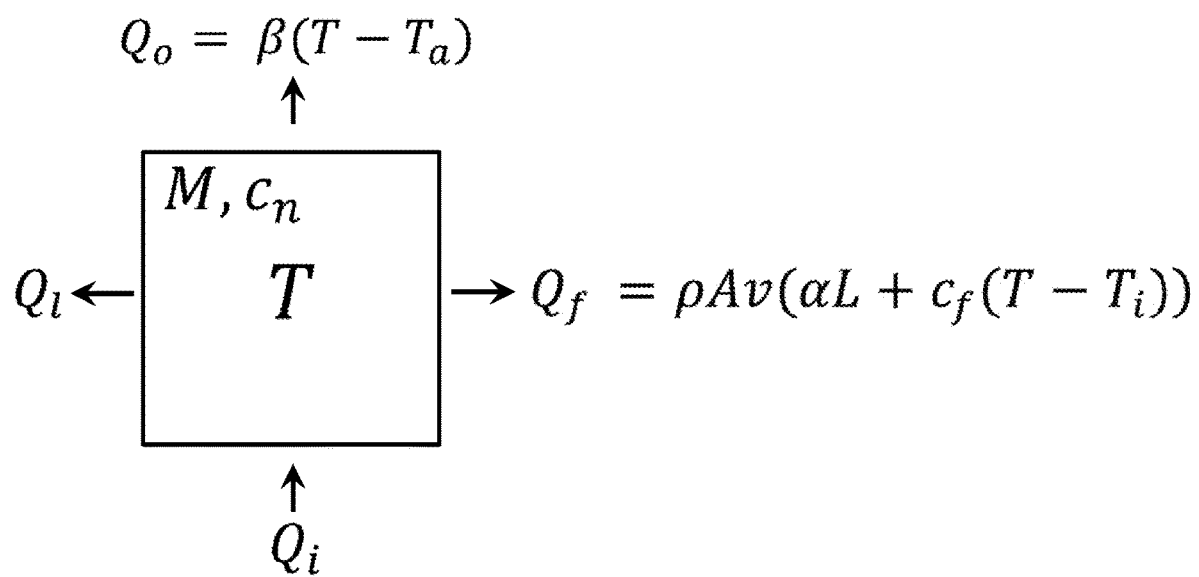
FIG. 8 shows a model illustrating a model of temperature change in a nozzle during extrusion.

FIG. 8 shows a model illustrating temperature change in a nozzle during extrusion.

$Q_i$: Thermal power from heater, a constant [W]

$Q_o$: Thermal power extracted by cooling fluid [W]

$Q_f$: Thermal power required to condition the build material [W]

$Q_l$: Thermal power lost to the environment [W]

T: Temperature of Nozzle [K]

$T_i$: Temperature of incoming filament [K]
$T_a$: Temperature of incoming cooling gas [K]
$\beta$: Proportionality const, modified by changing flow rate of cooling gas [W/K]
$c_n$: Specific heat of nozzle material [J/kg-K]
$c_f$: Specific heat of filament material [J/kg-K]
L: Latent Heat of Fusion of filament material [J/kg]
$\rho$: Mass density of filament material [kg/m$^3$]
M: Mass of nozzle [kg]
A: Cross sectional area of filament [m$^2$]
v: filament feed rate [m/s]
$T_o$: Operating point temperature of nozzle used in linearization [K]
$\Delta T$: Variation in nozzle temp around operating point [K]
$v_o$: Operating point velocity of filament used in linearization [m/s]
$\Delta v$: Variation in filament velocity around operating point [m/s]
$\alpha$: Mass fraction of extrudate which is liquid The thermal power transferred from the nozzle into the filament is proportional to the filament feed rate and goes into heating the filament from room temperature to the operating temperature and supplying the heat of fusion required to melt the required portion of the extrudate. For a properly operating system, the thermal power will be the amount of power required to condition the build material for extrusion and deposition, and is described by:

$$Q_f = \rho A v (\alpha L + c_f(T - T_i))$$

The thermal power removed by the cooling fluid is proportional to the difference in temperature between the nozzle and the fluid. The constant of proportionality increases with an increase in the flow rate of the cooling fluid:

$$Q_o = \beta(T - T_a)$$

The instantaneous energy balance for this system is:

$$Mc_n \frac{dT}{dt} = Q_i - Q_o - Q_l - Q_f \quad (1)$$

$$Mc_n \frac{dT}{dt} = Q_i - \beta(T - T_a) - Q_l - \rho A v(\alpha L + c_f(T - T_i)) \text{ and} \quad (2)$$

$$T = T_o + \Delta T \text{ and } v = v_o + \Delta v \quad (3)$$

Substituting Eqs. (2) and (3) into Eq. (1) and noting that $$\frac{dT_o}{dt} = 0$$

at steady state:

$$Mc_n \frac{d\Delta T}{dt} =$$
$$Q_i - \beta(T_o + \Delta T - T_a) - Q_l - \rho A(v_o + \Delta v)(\alpha L + c_f(T_o + \Delta T - T_i))$$

expanding the last term:

$$Mc_n \frac{d\Delta T}{dt} = \quad (4)$$

$$Q_i - \beta(T_o + \Delta T - T_a) - Q_l - \rho A [v_o \alpha L + v_o c_f T_o + v_o c_f \Delta T -$$
$$v_o c_f T_i + \Delta v \alpha L + \Delta v c_f T_o + \Delta v c_f \Delta T - \Delta v c_f T_i]$$

Now, at steady state, $$\Delta T = 0; \Delta v = 0; \frac{dT_o}{dt} = 0 \quad (5, 6, 7)$$

Substituting Eqs. (5, 6, 7) into Eq. (4) gives:

$$0 = Q_i - \beta(T_o - T_a) - Q_l - \rho A[v_o \alpha L + v_o c_f T_o - v_o c_f T_i] \quad (8)$$

Subtracting Eq. (8) from Eq. (4) gives:

$$Mc_n \frac{d\Delta T}{dt} = -\beta(\Delta T) - \rho A[v_o c_f \Delta T + \Delta v \alpha L + \Delta v c_f T_o + \Delta v c_f \Delta T - \Delta v c_f T_i]$$

and noting that the second-to-last term goes to zero because it is product of two differences:

$$Mc_n \frac{d\Delta T}{dt} = -\beta(\Delta T) - \rho A[v_o c_f \Delta T + \Delta v \alpha L + \Delta v c_f (T_o - T_i)] \quad (9)$$

This first order ordinary differential equation solves to:

$$\Delta T = B[1 - e^{-t/\tau}] \quad (10)$$

Where:

$$B = \frac{-\rho A \Delta v (\alpha L + c_f(T_o - T_i))}{\beta + \rho A v_o c_f}; \tau = \frac{Mc_n}{\beta + \rho A v_o c_f} \quad (11, 12)$$

According to Eqs. 10-12, if $\beta=0$ (this is the case of no cooling), then no thermal power removal. The thermal power input will readjust to the value required to condition the build material filament with no additional amount available to flow through and then be removed from the nozzle through the cooler 362. In this case, Eqs. (11, 12) reduce to:

$$B = \frac{-\rho A \Delta v (\alpha L + c_f(T_o - T_i))}{\rho A v_o c_f}; \tau = \frac{Mc_n}{\rho A v_o c_f} \quad (14, 15)$$

Comparing Eqs. (14, 15) to Eqs. (11, 12), it is seen that the addition of deliberate cooling 362 (i.e. the removal of thermal power, and therefore requiring the addition of even more thermal power into the system) reduces both the magnitude of the response and the time constant of the response. In other words, the temperature of the nozzle body changes less and it reaches this smaller magnitude of change faster.

Another point of note is that the thermal power transferred away from the nozzle via cooling has some dependence on the nozzle temperature, for some embodiments and as an aspect of the current inventions. Specifically, in the case of forced cooling with a constant mass flow rate and incoming fluid temperature, the thermal power transferred out increases as the nozzle temperature increases. This can be understood by first noting what would happen if both the thermal power added and the thermal power removed were constant and equal. (Thermal power added being constant can be accomplished by applying a constant amount of electrical power to a Joule heating element, for example.) In this case, the temperature of the nozzle would remain constant when the filament build material is stationary. However, as soon as the filament build material begins to move, and thus begins to withdraw additional thermal power from the nozzle, the temperature of the nozzle would begin to decrease and it would continue to decrease. However, if, when the temperature of the nozzle drops, the amount of thermal power withdrawn by cooling drops, then a new steady state will arise, which is the desired outcome of the present inventions.

A useful concept, which is discussed below, is called the Thermal Power Ratio (TPR). TPR is used herein to mean the ratio of the steady state amount of thermal power $Q_O$ that flows through the nozzle body and out from and away from the nozzle to the steady state thermal power $Q_f$ that is required to condition the moving filament build material for extrusion. Thus, $TPR=Q_O/Q_f$.

Now for a specific example. We will consider the extrusion of an aluminum alloy as the build material, and use the density, specific heat and latent heat of fusion of pure aluminum as being approximately representative of the alloy. We will look at the stability inherent to the nozzle operation without the addition of feedback methods based on temperature measurement. We will take the diameter of the filament to be 1.7 mm, the operating point velocity of the filament to be 14.1 mm/s, the desired liquid mass fraction of the extrudate to be 0.6. The operating point temperature will be taken to be 600 degrees C., as might be the case for an aluminum-silicon alloy in the two-phase region corresponding to silicon content less than the eutectic composition. The incoming temperature of the filament is taken as 30 degrees C. and the incoming temperature of the cooling fluid is taken as 20 degrees C. We will assume that the thermal power lost to the environment is 65 W. The thermal power required to condition the filament can now be calculated to be 65 W. We will look at a case where the speed of the filament drops by 10% (from 14.1 to 12.7 mm/s). Now we look at two cases.

Figure 9A:
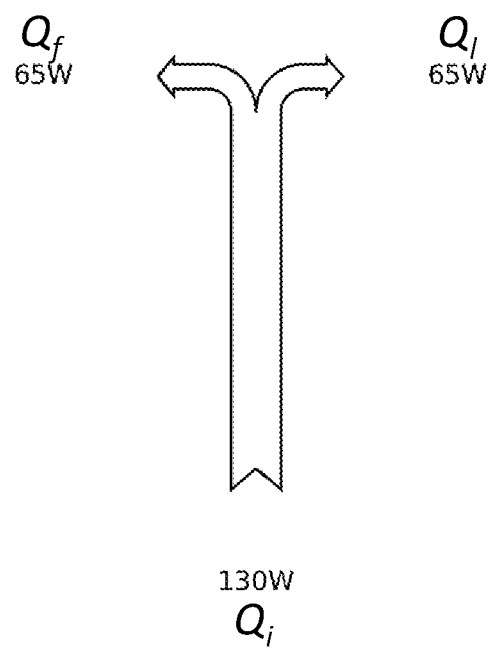
FIG. 9A shows, schematically, relative amounts of thermal power added by a heater, transferred to a build material to condition it and lost to ambient, for a case where the build material feed rate is non-zero.

In the first case, there is no active cooling at the nozzle inlet and so, in the above analysis, thermal power extracted by the cooling fluid is zero. The heater is inputting exactly the required power to condition the filament, 65 W, and losses to the environment, coincidentally also 65 W, totaling 130 W, as illustrated in thermal power flow diagram FIG. 9A (It should be noted that this situation depicts one in which inventions disclosed herein, of adding and removing relatively large amounts of thermal power, are not used). The ratio of thermal power extracted by the cooling fluid to thermal power to condition the filament, the quantity known as TPR, is zero. In this case, the temperature of the nozzle would increase by 84 degrees C. upon the filament speed change. The extrudate would now be fully molten—no longer in a multi-phase state, as required for extrusion.

Figure 9B:
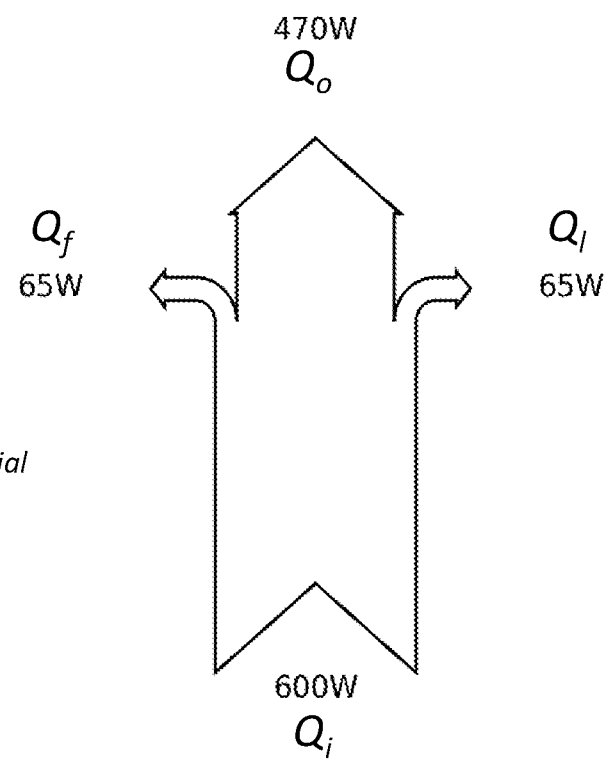
FIG. 9B shows, schematically, relative amounts of thermal power added by a heater, transferred to a build material, lost to ambient, and removed by a cooler at a rate of 470 watts, for a case where the build material feed rate is non-zero.

In the second case, there is active cooling at the nozzle inlet with a magnitude of 470 W at the operating point, corresponding to a TPR of 470 W/65 W=7.23. The heater is supplying 600 W, and as before 65 W are lost to the environment. This is illustrated in the power flow diagram FIG. 9B. From this information, the parameter β can be calculated, and we can then calculate that after the transient, the steady state temperature will rise by 7.3 degrees C. to 607.3 degrees C. The extrudate will still be in the two-phase region, although the liquid content will have increased. In this way, the robust nozzle of the present invention provides inherent stability.

Maintaining a high thermal power flow into and out of the nozzle to aid in temperature control can be used in a case where it is desired that the temperature of the entire nozzle is substantially uniform. Alternatively, it can be used in the case where the goal is to maintain a particular temperature profile within the nozzle body. Thus, it is another aspect of the present teachings to establish and control a temperature profile within the body of the nozzle.

The preceding analysis also applies to a case where the locations at which thermal power is added and removed are spaced some distance from one another axially along a nozzle body. In order to provide a temperature profile between inlet and outlet that is monotonic with position, an embodiment may establish this profile by the conduction of thermal power along the length of the nozzle body from the outlet end to the inlet end. Thermal power conduction in a solid establishes a temperature gradient and is characterized by Fourier's law. A flow of thermal power may be established within the body of the nozzle by adding thermal power near the nozzle outlet to maintain an outlet temperature in combination with removing thermal power near the inlet end in order to maintain a lower inlet temperature. The temperature profile that is established depends on the thermal conductivity, cross sectional area perpendicular to the direction of heat flow and length of the nozzle body. In some embodiments, the result will be a substantially linear temperature profile between the inlet and the outlet. For example, if the nozzle body is of uniform cross section and uniform material along its length, then the temperature profile between inlet and outlet would typically vary approximately linearly as a function of position. In other embodiments, the cross-sectional area or thermal conductivity may vary along the axial length of the nozzle. The temperature stabilization due to the imposition of a large amount of thermal power flowing through the nozzle body as described in the analysis above, now works to stabilize the temperature profile in the nozzle body, also leading to a thermally robust nozzle with respect to temperature profile.

Of course, for both the case of a deliberate temperature profile nozzle and a nozzle with a primarily singular temperature, feedback control can be added to further stabilize the nozzle temperature. Regardless, by maintaining a high thermal power flow through the nozzle, a mechanism for temperature control can be provided that happens automatically, even in the absence of feedback or feedforward control. Further, it can be shown that the response time of the system may be dramatically improved. For example, there may be no lag time due to the response times of a measurement, a power supply, a heater, or the need for the newly added thermal power to conduct to where it is needed—as there would be in feedback control. The system can now rapidly and reliably respond to disturbances. In addition, the approach where thermal power is both added and removed may lead to the ability to respond rapidly to situations where the temperature is too low as well as to situations in which the temperature is too high.

Thus, part of the current teachings may include providing a nozzle for extrusion, where a substantial amount of thermal power flow both into and out of the nozzle is maintained, regardless of the volume flow rate through the nozzle, including during times of no extrusion. This thermal power flow so maintained may be approximately at least half, and preferably comparable, and more preferably greater than, and more preferably, substantially greater than, the amount of thermal power flow required to raise the temperature of the incoming filament build material such that it has rheological behavior suitable for extrusion at the commanded volume flow rate.

In steady state, the amount of thermal power that flows within the body of the nozzle from the outlet end to the inlet end and then out from the nozzle entirely is preferably greater than the amount of thermal power required to condition the moving build material to the rheological behavior required for extrusion. It is noted that, in some cases, this may be a build material filament which is in a multi-phase state with at least one liquid phase present and at least one solid phase present. General considerations concerning TPR are set out below.

A large TPR may mean that the temperature profile from the nozzle inlet to the nozzle outlet will not change much over time as the metal filament build material starts and stops moving during extrusion. During the course of building a three-dimensional object, and even during the course of building a single layer or an extruded line of a three-dimensional object, the extrusion speed may vary from a complete stop to a maximum speed and often, speeds in-between these extremes. As the filament build material extrusion speed varies, the amount of thermal power $Q_f$ that is communicated to the metal filament build material may change significantly and rapidly over time. It may therefore be advantageous to have a nozzle that maintains substantially the same temperature profile regardless of filament build material speed. The present teachings may accomplish this goal by creating a circumstance where the varying thermal power required for the filament build material $Q_f$ is a relatively small portion of the thermal power $Q_O$ removed by a cooling fluid. When the filament build material is not moving, very little thermal power $Q_f$ may flow into the filament build material and the temperature profile along the nozzle is determined by the flow of thermal power along the nozzle from the outlet to the inlet. As the filament begins to move, thermal power may flow from the nozzle body to the filament build material. When TPR is large, the amount of thermal power used to condition the filament build material is much smaller than the amount of thermal power $Q_O$ removed by the cooling fluid, and as such, the impact on the temperature profile of the nozzle body is relatively small.

In general, the higher the TPR, the better will be the performance of the robust described herein. By better performance, it is meant the smaller will be the change in temperature and temperature profile caused by a given change in operating conditions. There is monotonic improvement as TPR increases. For example, considering a case where 50 W of thermal power $Q_f$ are needed to condition the build material as it moves through the nozzle. In principle, a very large TPR of, for example, 1000, could be established by adding $Q_i$ something a bit in excess of 50,000 W of thermal power at the nozzle outlet and removing $Q_O$ approximately 50,000 W of thermal power at the nozzle inlet. Of course, many practical considerations will prevent this scenario from being achieved. First, it would be completely impractical to use 50,000 W of power to heat the nozzle for economic and environmental reasons alone. Even if it were available, it would be extremely difficult to apply this much thermal power to the small region around the nozzle outlet. Even the highly concentrated application of power using induction heating would be unlikely to suffice. Likewise, it would be extremely difficult to remove sufficient power from the inlet end of the nozzle. In a typical embodiment, such thermal power is removed by machining an annular channel in the face of the nozzle at the inlet end and capping this channel with a thin metallic cover, for example, made of stainless steel. This thin cover can also act as the mechanical support for the nozzle (maybe take this out, unless we do a figure). Cooling gas is then blown into the annulus through a radially disposed tube pressed into the nozzle body and exits diametrically opposed through another tube. This mode of thermal power removal is limited by the heat transfer coefficient between the flowing gas and the annulus and could never achieve the rates in this admittedly extreme example.

Further, even if it were possible and practicable to add and remove these large amounts of thermal power, the temperature drop between nozzle outlet and inlet would be prohibitively large for a reasonable length of nozzle and well outside the desired range. The nozzle is already made of material with high thermal conductivity, and so, only a small amount of increase of thermal transfer within the nozzle body is possible by alternate material selection. The cross-sectional area may be increased, but this becomes impractical at some point and further, helps less than it might at first appear. This is because as the cross-sectional dimension increases, the thermal power, which is flowing along the axis of the nozzle toward the periphery of the nozzle is at a distance from the center of the nozzle, where thermal power must be transferred to the contained build material. In order to traverse this distance a radial temperature gradient must be established, thereby reducing the effectiveness of the temperature control at the nozzle bore center, where it is most important.

Figures 9C, 9D:
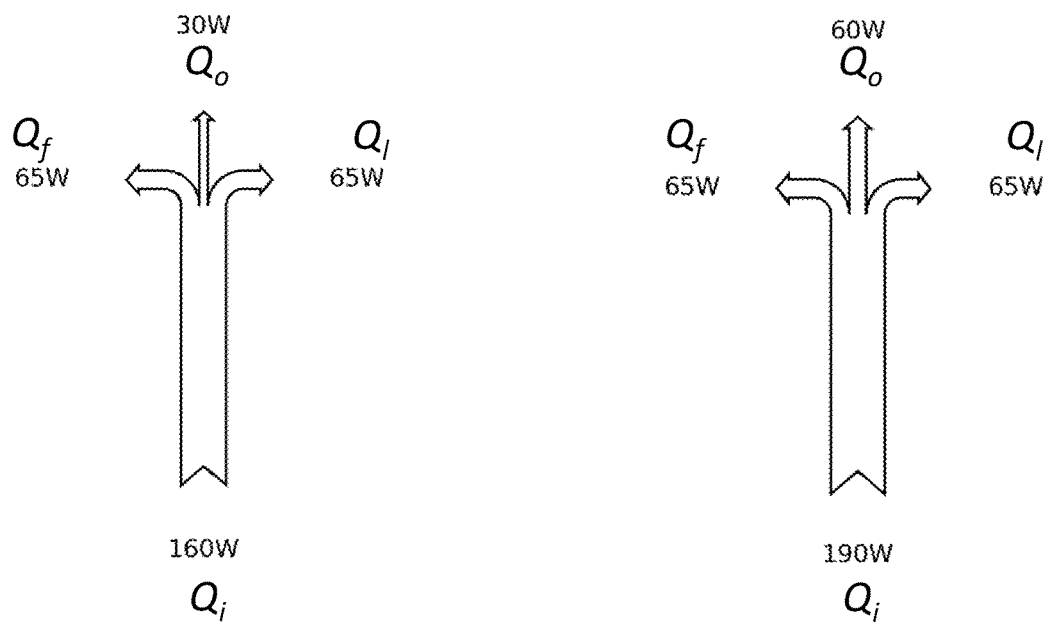
FIG. 9C shows, schematically, relative amounts of thermal power added by a heater, transferred to a build material, lost to ambient, and removed by a cooler at a rate of 30 watts, for a case where the build material feed rate is non-zero.
FIG. 9D shows, schematically, relative amounts of thermal power added by a heater, transferred to a build material, lost to ambient, and removed by a cooler at a rate of 60 watts, for a case where the build material feed rate is non-zero
Figure 9E:
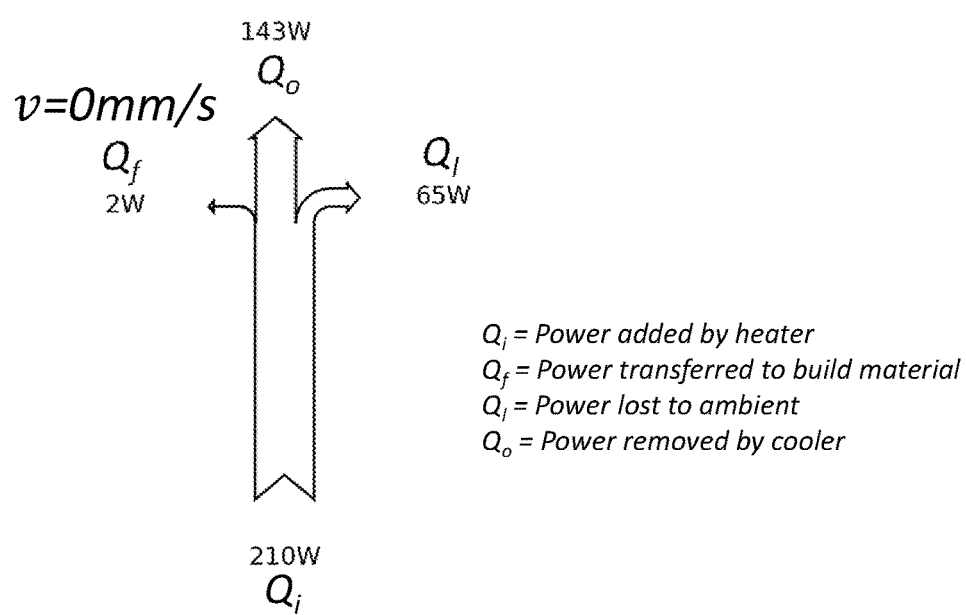
FIG. 9E shows, schematically, relative amounts of thermal power added by a heater, transferred to a build material, lost to ambient, and removed by a cooler at a rate of 143 watts, for a case where the build material feed rate is zero.

For all these reasons it can be understood that practical limitations will result in the TPR being lower than theoretical considerations would dictate. In some cases it will be practical to implement a TPR as high as 10. In some cases, a TPR of 5 may be the highest possible. In other cases, especially in cases involving a high rate of build material extrusion, the highest TPR practical may be 2 or even as small as approximately 1 or even 0.5. It will be understood that the current inventions are substantially independent of the precise value of the TPR and may be said to apply even at a TPR of approximately 0.5. Such low TPR examples are illustrated in the steady state thermal power flow diagrams FIG. 9C and FIG. 9D. The example in FIG. 9C has a TPR of approximately 0.46 ($Q_O/Q_f$=30 W/65 W=0.46), while the example in FIG. 9D has a TPR of approximately 0.92 ($Q_O/Q_f$=60 W/65 W=0.92).

Of particular relevance to multi-phase processing is an embodiment where a desired temperature profile or gradient is maintained along the length of the nozzle, from the inlet to the outlet. In one embodiment, the temperature of the inlet is maintained near to the solidus temperature of the build material filament alloy, so that the filament does not begin melting until it has entered the body of the nozzle. In some cases, the temperature of the inlet will be maintained below the solidus temperature. In some cases, the temperature of the nozzle inlet can be somewhat above the solidus temperature because thermal power is being removed from the build material at the inlet by conduction up the metal build material filament, away from the nozzle and away from the inlet, and thus, the metal filament will not begin to melt until it is within the bore 304 of the nozzle, past the inlet 305, even if the temperature of the nozzle inlet 305 is somewhat higher than the solidus temperature of the alloy. In most cases, the temperature of the outlet 316 will be maintained below the liquidus temperature, but distinctly above the solidus temperature. In this way, the temperature of the extrudate is between the liquidus and the solidus upon exit from the nozzle outlet. That is, the extrudate is in a multi-phase, state, because the temperature is in a multi-phase region, of the relevant phase diagram, which allows for parts to be built up in layers. There may be cases where the temperature of the outlet is maintained at or even slightly above the liquidus temperature, so as to provide build material extrudate at a desired multi-phase temperature, due to the temperature drop between nozzle and extrudate needed in order to conduct the thermal power into the extrudate.

Thus, temperature may be controlled in at least two physical locations along the body of the nozzle, the inlet and the outlet. (Another embodiment is discussed below, in which radial, rather than axial locations are considered, and yet another, in which a single temperature location is considered, rather than two.) In an embodiment, the outlet temperature may be controlled by measuring the temperature and adjusting the amount of thermal power $Q_i$ being added by the heater 306 at the outlet 316 of the nozzle. This controlling action may be performed by the controller 330. The thermal power input $Q_i$ can be added by electrical resistance heaters, by induction heating, and by other methods of heating known in the art. The inlet temperature may be controlled by measuring the temperature and adjusting the amount of thermal power $Q_O$ removed from the inlet 310 area by the cooler. The thermal power may be removed by, for example, flowing air or other cooling fluid at the inlet of the nozzle. In cases where the nozzle should be operated in an inert environment, the cooling gas may also be inert, for example argon. In some cases, nitrogen or carbon dioxide might be sufficiently inert. The temperature at the inlet may be controlled by a controller 330 by modulating the flow rate of the cooling fluid. The temperature profile between the inlet and the outlet may be determined by the conduction of thermal power from the outlet to the inlet.

The temperature of the metal build material as it exits the nozzle can be accurately controlled to provide that the rheological behavior of the metal build material exiting the nozzle is allows for freeform fabrication according to techniques described herein. In addition, the temperature of the build material filament can be controlled so that the build material filament enters the nozzle body at a temperature below the solidus temperature and therefore has sufficient mechanical stability at a location within the nozzle bore 304 to act as a piston for the extrusion process. The transition of the metal build material from all solid to multi-phase may occur in a well-controlled manner within the nozzle bore 304.

In the present teachings as applied to the case of establishing and maintaining a desired temperature profile along the length of the nozzle, the thermal power $Q_f$ conducted along the length of the metal build material filament may be deliberately designed to be markedly less than a significantly larger amount of thermal power that is conducted through a nozzle body, from the outlet to the inlet, and, in particular, the amount of thermal power $Q_O$ that is removed by the cooling fluid. Thus, the thermal power load imposed by the filament $Q_f$ will not significantly impact the temperature profile in the nozzle body.

As a particular example, a nozzle for the extrusion of a 90 wt % zinc zinc-aluminum binary alloy will be presented. To achieve the desired rheological behavior for FFF, a liquid fraction of approximately 80 at % was experimentally determined to be optimal. This corresponds to the equilibrium condition at a temperature of approximately 410 degrees C. from the phase diagram (FIG. 4D. Therefore, the outlet temperature is set to 410 degrees C. From the phase diagram, it can be seen that the solidus temperature is 380 degrees C. Therefore, the inlet temperature was set below the solidus temperature at 365 degrees C. The build material is provided to the nozzle in the form of a filament with a diameter of 1.75 mm. The maximum desirable build material feed rate is 30 mm/s. The dimensions of the nozzle and the material selection were chosen in part to achieve the desired TPR at the maximum feed rate. Here, a TPR of 1.7 was desired and the build material requires approximately 128 W to condition at 30 mm/s. Rearranging the TPR equation reveals the cooler must be able to extract at least 217 W. That is to say, at least 217 W of thermal power required for the cooler is able to flow from the heater through the thermal cross-section of the nozzle body and to the cooler. Some additional considerations for the nozzle design are presented in the following paragraphs. FIGS. 8E, 8F, and 8G illustrate the steady state thermal power flows for such a nozzle and operating temperatures at various build material feed rates (specifically, 0, 15 and 30 mm/s, respectively). In these figures $Q_f$ represents the thermal power that flows into the filament build material, $Q_i$ represents the total amount of thermal power input to the system, $Q_l$ represents the total amount of thermal power lost to the environment, and $Q_o$ represents the amount of thermal power removed by cooling. Here it can be observed that under various build material feed there exists a large amount of thermal power extracted by cooling fluid as compared to the thermal power required to condition the build material. Specifically, computing the TPRs in each case yields 71.5, 2.07, and 1.7, respectively. It should be noted that even in the case of zero build material feed rate, there may still be a small amount of thermal power is transferred to the build material and conducted along its length. In this example, this quantity is approximately 2 W. Therefore, as designed, the limiting TPR of the system is 1.7, meaning that the nozzle has excellent robustness at the maximum build material feed rate and further improved robustness when operating at slower feed rates.

In embodiments, a temperature profile in the nozzle may be established when no filament build material is in place or is stationary, as is illustrated in FIG. 10E. When build material is then pushed through the nozzle, there may be a maximal amount of thermal power withdrawal by the filament. The filament may be quickly accelerated from 0 mm/s to 15 mm/s and may require 65 W to condition. This constitutes a transient condition. Before a feedback controller has the opportunity to react, the large amount of thermal power withdrawal required to condition the build material may appear to be a large disturbance. However, by flowing a comparatively large amount of thermal power through the nozzle body subsequently removed by the cooler, $Q_O$, the temperature profile in the transition zone between the inlet and the outlet will be only minimally disturbed by the motion of the build material and its momentary withdrawal of 65 W of thermal power from the 210 W being supplied by the heater. Subsequently, with some assistance from a controller, the nozzle arrives at the new steady state condition at the desired target temperatures illustrated in FIG. 8F.

As the build material feed rate changes, the amount of thermal power needed to condition it to the desired temperature invariably changes. As the build material feed rate decreases from its maximum, the TPR goes up. However, the thermal coupling should be designed at the maximum envisioned feed rate in order to achieve the appropriate robustness over all envisioned operating conditions. Here, thermal coupling refers to the pairing a thermal actuator (i.e. the heater or the cooler) with the nozzle body both in terms of spatial placement but also in terms of the flow of heat or communication of thermal power between the actuator and the nozzle body.

In the present teachings, the nozzle body may be made of a material or materials with high effective thermal conductivity so that its temperature and temperature profile may be well controlled and so that it may communicate thermal power to the filament without suffering large changes in its own temperature profile. For illustration, consider a slab of low thermal conductivity material such as a polymer like bakelite, chosen for this illustration because of its ability to withstand temperatures of 300 degrees C. or more. Now let this slab of bakelite come up to a temperature of 300 degrees C. in an oven and then touch a solder wire to it with a melting point of 220 degrees C. A small bit of the tip of the wire may melt, but the melting will stop quickly because the surface temperature of the bakelite at the location of contact will drop quickly. This is because this surface temperature must be much lower than the bulk temperature so that thermal power can be conducted from the bulk to the surface despite the low thermal conductivity of bakelite. In contrast, consider that the slab where made of copper. In this case, the wire solder would continue to melt against the slab for a long while because the thermal power from the bulk of the copper slab is conducted to the surface of the slab with little temperature drop. Soldering iron tips are made of copper for this reason. It may therefore be advantageous to make the nozzle body out of a high thermal conductivity material so that when the metal filament touches a wall of the body, the surface temperature of the wall at that point does not change dramatically.

In order to maintain a high thermal power flow $Q_O$ through and away from the nozzle, there should be a highly conductive thermal path between the nozzle outlet 316 and inlet 310. For example, in the case of the nozzle with a deliberate temperature profile for which thermal power is added at the outlet and removed at the inlet, there must be a thermal power conduction path between the outlet and the inlet. The nozzle may be constructed of a high thermal conductivity material and may have an effective thermal conduction cross-sectional area that is large compared to that of the metal filament build material. Importantly, the thermal power conducted along the length of the metal build material filament may be deliberately designed to be markedly less than a significantly larger amount of thermal power that is conducted through a nozzle. For example, for the extrusion of a filament build material of zinc-aluminum alloy (for which a representative phase diagram is shown in FIG. 4.6), of 1.75 mm diameter, the nozzle body may be made of graphite, with a thermal conductivity of approximately 100 W/m-K and may have an outside diameter of 32 mm. Such a nozzle body might have any length between 20 and 75 mm, with a preferred range of 30-50 mm.

The material of the nozzle body should have strength at the operating temperature sufficient to keep its form. For example, a nozzle body made of copper may become too soft at temperatures above 600 degrees C., or even lower, even though copper's melting point temperature is above 1000 degrees C. Graphite may be a suitable material and may be used in an air environment at temperatures of up to 500 degrees C. and in an inert environment at temperatures up to 1800 degrees C., for example. Copper infiltrated graphite has an even higher thermal conductivity and is suitable for use in air at temperatures up to 500 degrees C. and in an inert environment at temperatures of up to at least 700 degrees C.

The material of the nozzle body should resist chemical interaction with whatever it comes in contact. For example, copper may be a useful material for the nozzle body in some circumstances. However, if the nozzle body must operate in air, without a protective environment, a copper nozzle body may be subject to oxidation and should be, at a minimum, coated with an oxidation resistant layer, such as plated nickel.

The internal surface of the nozzle body should resist chemical interaction with whatever it comes in contact. In some cases, the filament build material may touch this inner surface directly, and in this case, the material of the nozzle body or the coating on it should resist chemical interaction with the solid filament build material and any molten component of the filament.

There may be instances where a preferred nozzle body material interacts unfavorably with the material of the build material metal filament, either through chemical interaction or some other surface interaction including wetting, abrasion, porosity, and others. In such a case, an aspect of the present teachings may include the use of a liner within the body of the nozzle. For example, for extrusion of zinc-aluminum, a graphite outer body and a graphite inner sleeve may be used, where the grades of graphite are different. A particularly high thermal conductivity grade may be chosen for the outer body, and a harder, more abrasion resistant grade may be chosen for the inner sleeve. This construction may have the advantage that the nozzle may be refurbished by pushing out a sleeve, and press-fitting in a new one. Alternatively, the inner sleeve could be of a ceramic material such as alumina, silica, zirconia, or others.

Additionally, there must be a sufficiently large effective heat transfer coefficient between the incoming build material and the inner surfaces of the nozzle bore 304, such that the filament build material achieves the desired rheological behavior for all desirable feed rates. The effective heat transfer coefficient includes all mechanisms of heat transfer (convective, radiative, and conductive), which are active within the nozzle. The primary heat transfer mechanism is most often conduction and so one must be conscientious of the surface area to volume scaling law when selecting a build material filament diameter.

One skilled in the art will note that imposing a temperature on the surface of the nozzle bore is not sufficient to ensure the build material achieves that temperature, but only that the build material approaches this temperature in the limit. Advantageously, the high thermal conductivity of the metallic build material may facilitate its arrival at the nozzle bore temperature under reasonable timescales. That being said, some amount of error between the true temperature of the extrudate and the prescribed outlet temperature, for example, is acceptable. At various places within this disclosure, the temperature of the nozzle inlet, nozzle outlet, and the nozzle bore at different locations along its length, are discussed, and it is implied that the temperature of the build material within the nozzle bore at these locations is essentially equal to that of the nozzle components discussed. This is a simplification, but one that will be understood by the skilled person in the art. In such cases it will be understood that the use of the term solidus temperature corresponds to the lower end of the working temperature range and the use of the term liquidus temperature corresponds to the upper end of the working temperature range.

The thermally robust nozzle as described herein may provide for robust control over the axial temperature profile in the transition zone because this temperature profile is necessarily created by thermal power conduction through the body of the nozzle from the heater 306 to the cooler 362. Robust control of the temperature profile in the transition zone may be advantageous because disturbances to thermal power loading on the nozzle may be inherent in the process.

The filament build material starts and stops and must be fed at different rates, depending on the geometry being created. The extrudate build material exiting the nozzle outlet 316 engages with the part being built 390 and disengages, thereby also changing the thermal power load on the nozzle.

As discussed above, FIG. 3 shows an extruder for a three-dimensional printer, such as the exemplary printer 100 of FIG. 1. In an embodiment, the heating system 306 provides thermal power to the nozzle 302 near the outlet end 316 of the nozzle body 302 while thermal power is removed near the inlet 305 by operation of a cooling system 362. A temperature sensor 350 obtains a measurement near the outlet end 316 of the nozzle body 302, while another temperature sensor 360 obtains a measurement near the inlet end 305 of the nozzle body 302. A cooling system 362 removes thermal power by active cooling to maintain a predetermined outlet temperature. In embodiments, the cooling system 362 may be an air distribution system that delivers cool air or another gas, or fluid, to the nozzle through a channel 364 in the nozzle 302. In other embodiments, the cooling system 362 may deliver air or other cooling fluid over fins thermally coupled to the nozzle body.

Based at least upon the measured outlet temperature and inlet temperatures, the thermal properties of the nozzle 302 and the controlled flow rate of the build material 310 by the drive system 308, the thermal gradient through the nozzle may be maintained near the target working range of the particular build material. The temperature of the nozzle body between the inlet 305 and the outlet 316 is then primarily determined by the conduction of thermal power between the two ends and the nozzle geometry. Typically, the target inlet temperature is chosen to be somewhat below the temperature at which the first liquid forms in the material (often a solidus temperature), such that the build material is wholly solid phase at the inlet 305. Typically, the target outlet temperature is chosen to be within a multi-phase zone (often between the liquidus and the solidus temperatures at the composition of the material), so that both liquid and solid are present in the extrudate at the outlet 316. For instance, taking the Al and Zn system having a phase diagram shown in FIG. 4.6, for an alloy having a composition that is 90 wt % Zn, if the inlet temperature is kept at below 380 degrees C., the build material will be solid. If for that concentration of Zn, the outlet is kept at 410 degrees C., the extrudate build material will be two phases of liquid and solid, and will be within the right hand cross-hatched region 419b, shown in FIG. 4.6.

Figure 10:
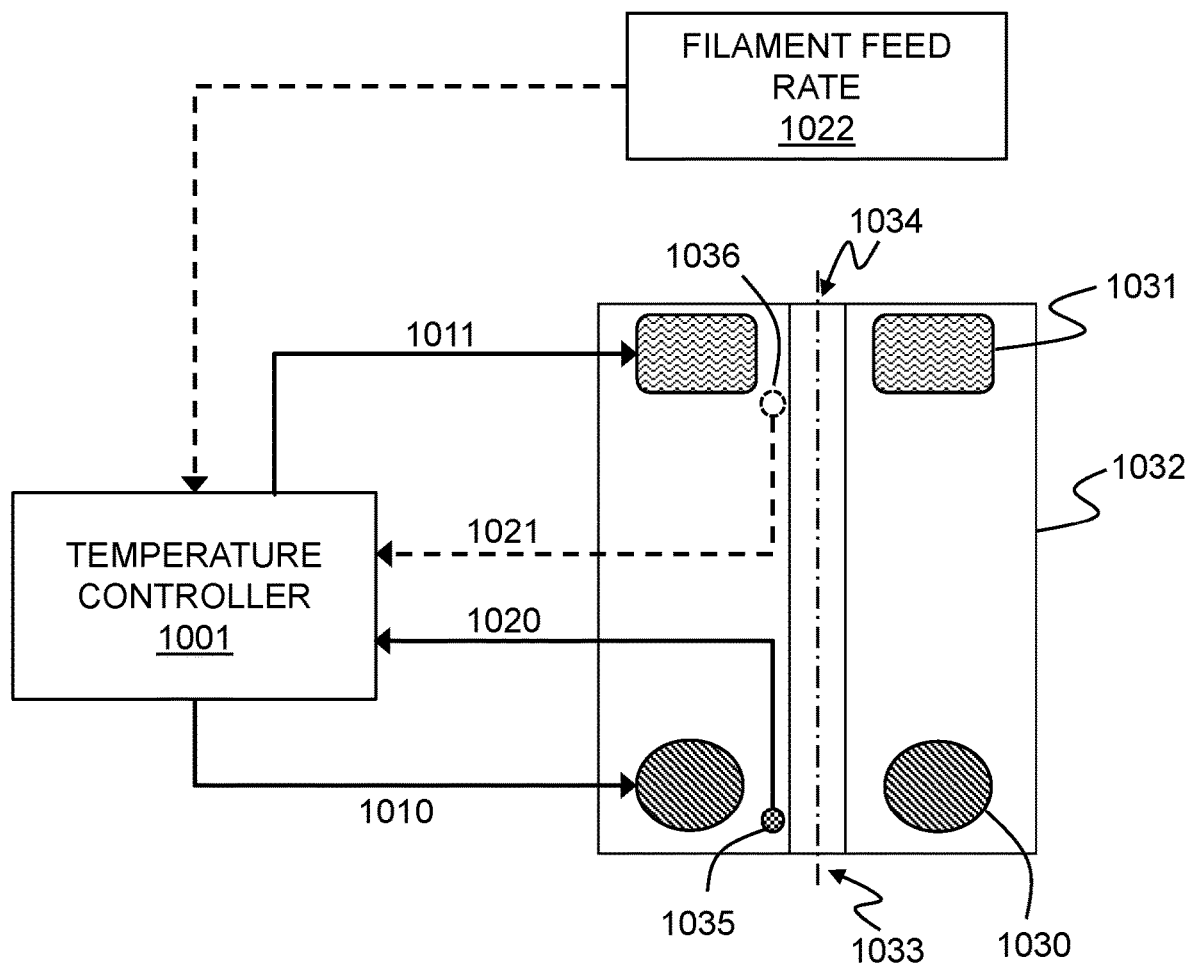
FIG. 10 shows, schematically, in block diagram form, a nozzle and temperature sensors and a heater and a cooler and a controller therefor.

As discussed, the inherent temperature stability of the robust nozzle may be augmented by implementing a controller. FIG. 10 shows schematically additional detail for the control of the temperature of a robust nozzle. A temperature controller 1001 receives temperature information 1020 regarding the nozzle body 1032 from at least one temperature sensor. Optionally, the controller receives additional temperature information 1021 from additional temperature sensors. In one embodiment, a temperature sensor 1036 near the inlet 1034 in close proximity to the nozzle bore and a temperature sensor 1035 near the outlet 1033 in close proximity to the nozzle bore are provided. Optionally, information about the build material feed rate 1022 may also be provided. A target temperature for each temperature sensing location is provided. The controller performs an algorithm involving the input(s) and the target(s) to generates a control signal 1010 to modulate the thermal power addition of the heater 1030 (for example, by changing the electrical power delivered by an inductive heater) and another control signal 1011 to modulate the effective thermal power removal of the cooler 1031 (for example, by changing the flow rate of a cooling gas) in order to attain the desired target temperature or temperatures. In the case where a singular temperature sensing location and target temperature exists, one of the thermal actuators, preferably the cooler, may be set to a constant control signal (i.e. open loop) while the other actuator is controlled in a closed loop fashion. Additional constraints may be imposed by the controller, such as always supplying a minimum amount of thermal power even in the case where the target temperature is exactly at the target temperature (i.e. zero error) to ensure a large amount of thermal power flow through the nozzle from the heater to subsequently be removed by the cooler, for example. In this way a high TPR may be enforced. A beneficial control architecture in the case where the controller must accept a plurality of inputs and control a plurality of outputs is known as a Multiple-Input and Multiple-Output (MIMO) controller. Specifically in the case where there is one heater and one cooler and each thermal actuator having a temperature sensor located in close proximity to itself, a 2×2 MIMO architecture may be implemented. In such an implementation, information regarding the heater may be used to further modulate the control signal to the cooler and information regarding the cooler may be used to further modulate the control signal of the heater through a model. In this way the controller may utilize the fact that the two thermal actuators are in physical communication with one another, via the conductive nozzle body, to achieve increased robustness.

FIG. 11 shows, schematically, in block diagram form, the steps of a method of an invention hereof for controlling the temperature profile of a nozzle, and thus, indirectly build material within the interior of a nozzle having two temperature control points. Specifically, the method 1100 may include controlling the temperature profile of a build material within the interior of a nozzle having one temperature control point, where the build material enters at the inlet 305 of the nozzle and the other temperature control point at or near the outlet 316 of the nozzle. The four activities represented by the steps 1102, 1104, 1106 and 1108 occur essentially simultaneously. Thermal power may be added to the nozzle region near the nozzle outlet 316 to set a pre-determined outlet temperature of the extrudate build material at step 1102. Thermal power may be removed by applying cooling fluid to a region near to the nozzle inlet 305 to set the pre-determined inlet temperature of the build material at step 1104. Typically, the site of thermal power removal is spaced from the site of thermal power addition, and thus, a temperature profile will be created between the two sites. In principle, the site of thermal power removal could be some distance from the nozzle inlet. There would be less direct control over the inlet temperature than if the site of thermal power removal were very close to the inlet, but the temperature would likely be lower than where the thermal power was being removed. It would still be important to measure temperature at the site of thermal power removal. The temperature near to the nozzle inlet 305 may be controlled to be significantly below the temperature near the nozzle outlet 316, typically by tens of degrees C. For example, a temperature difference of 50 degrees C. might be targeted. Between the upper and lower temperature control points, thermal power conduction through the body of the nozzle itself may establish and maintain a monotonically varying temperature profile. As the build material is driven through the nozzle at step 1106, temperature at a region near the nozzle outlet is monitored at step 1108. As the temperature is monitored at the nozzle outlet, thermal power may be added at step 1110 to compensate for any drop in temperature to maintain the predetermined outlet temperature. Typically, thermal power is added at the outlet end of the nozzle, for example by electrical resistance heating. Thermal power may also be removed at the inlet to the nozzle, for example by using forced air cooling. In this way, thermal power may be caused to flow from the outlet of the nozzle to its inlet.

Turning back to FIG. 3, one of skill in the art will recognize that additional heating elements may be added at different locations along the length of the nozzle to assist in maintaining a thermal gradient along the nozzle body. In particular, during transient situations, such as when the build material transitions from rest to be driven through the nozzle, it may be desirable to heat the nozzle inlet 305. This may seem counterintuitive, because it is desired to cool the inlet 305, so that the build material 310 remains solid. However, when the build material starts to move, the inlet 305 may cool even further, because momentarily the moving build material extracts a large amount of power and consequently an insufficient amount of power may flow from the heater through the nozzle to the inlet for the inlet to maintain its temperature, despite the best efforts of any controller. Thus, to keep the inlet at the desired temperature, it may be desirable to add thermal power at the inlet 305, and thus, use of a heater at the inlet (not shown in FIG. 3), at special times, may be beneficial. This set of events may be present not only when transitioning from build material that is stationary to moving, but also during transitions where the feed rate of the build material increases. Thus, auxiliary heating near the nozzle inlet, which is otherwise desired to be kept cool, may be useful.

Conversely, auxiliary cooling, near the nozzle outlet 316 (which is typically kept relatively warmer) may be useful during transients where the build material transitions from moving at a feed rate to a slower feed rate, or to stopping. The considerations are similar, but opposite. During transients such as slowing down or stopping the extrusion of build material, because thermal power is no longer being drawn away from the nozzle outlet due to the moving build material, the build material may momentarily become too warm (meaning the build material may no longer have the preferred rheological behavior for extrusion), despite the best efforts of any controller (i.e. by reducing the amount of thermal power added at the nozzle outlet). Thus, it may be desirable to be able to remove thermal power near the nozzle outlet by providing cooling (not shown in FIG. 3).

Figure 9F:
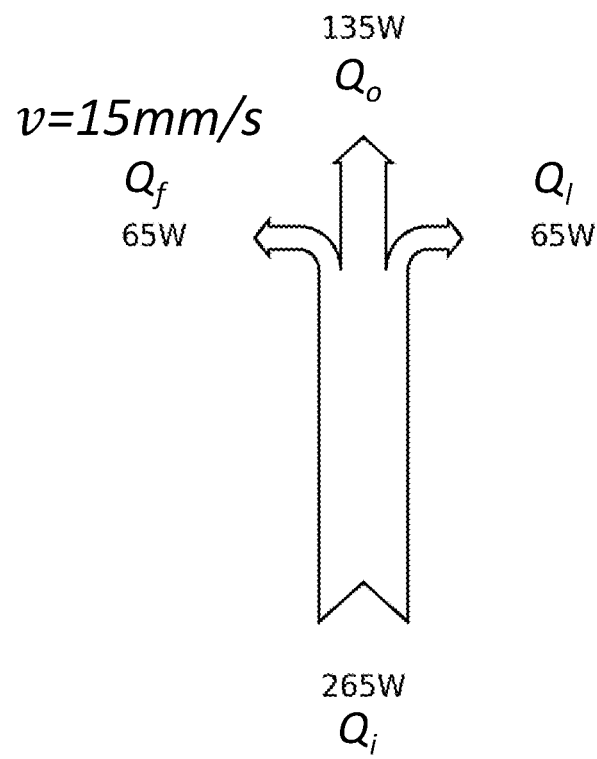
FIG. 9F shows, schematically, relative amounts of thermal power added by a heater, transferred to a build material, lost to ambient, and removed by a cooler at a rate of 135 watts, for a case where the build material feed rate is 15 mm/s.
Figure 9G:
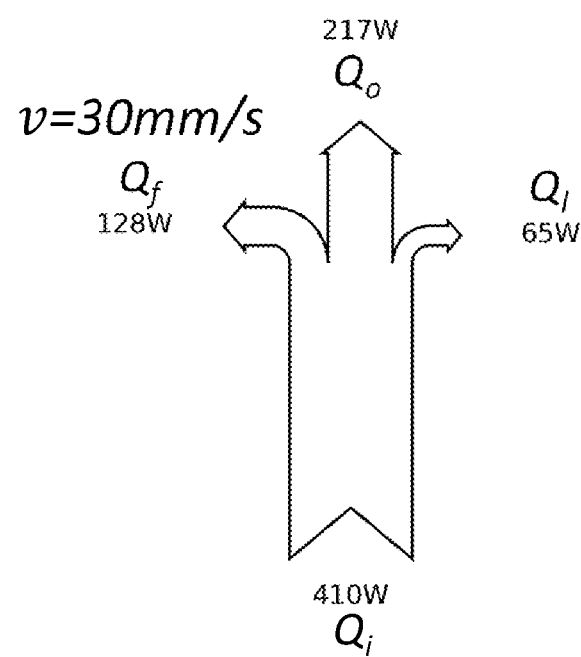
FIG. 9G shows, schematically, relative amounts of thermal power added by a heater, transferred to a build material, lost to ambient, and removed by a cooler at a rate of 217 watts, for a case where the build material feed rate is 30 mm/s.

In embodiments, the amount of thermal power conducted up the body and away from the inlet end of the nozzle significantly exceeds the thermal power required to condition the build material filament. For example, as shown in FIG. 9F, a thermal power of 135 W might be caused to flow up the body of the nozzle and out from the outlet to the inlet, whereas only 65 W may be required to melt the build material filament at the maximum deposition speed. This provides a very robust temperature profile in the transition zone.

In embodiments, a temperature profile in the nozzle may be established when no filament build material is in place. When build material filament is inserted at the inlet and pushed through, there may be a maximum thermal power withdrawal by the filament.

Figure 12:
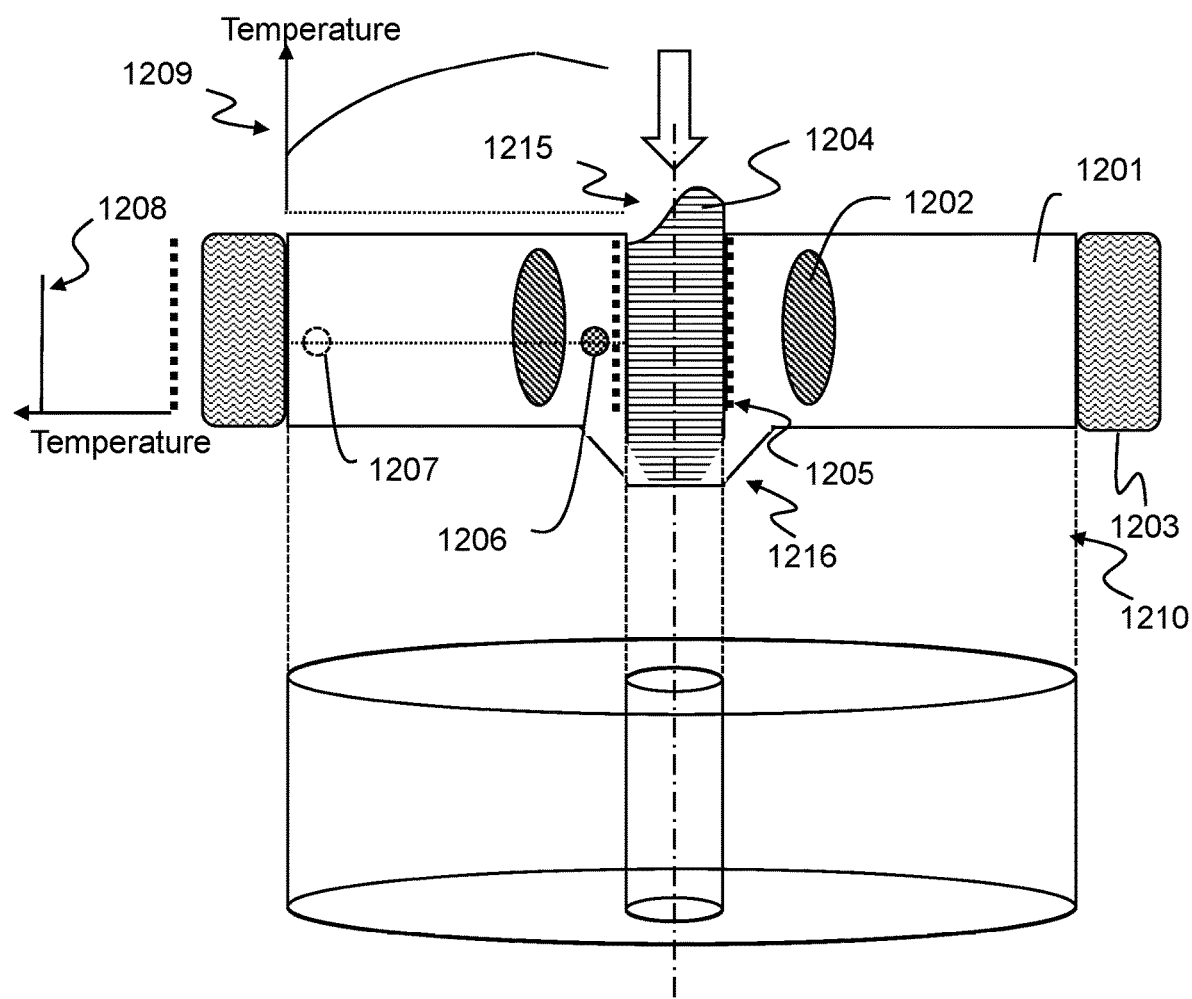
FIG. 12 shows, schematically, in cross-section above and representative 3D below, a nozzle of an invention hereof with heating and cooling arranged radially.

In another embodiment, shown schematically in FIG. 12, the location of thermal power addition and thermal power removal may be radially or substantially radially spaced from one another. The heater 1202 may be placed toward the wall 1205 of the nozzle bore 1204, and the cooler 1203 may be placed near the exterior surface 1210 of the nozzle body 1201. Thermal power flows from the heater to the cooler via conduction through the cross-section of the nozzle body. A temperature sensing element 1206 may be placed near the heater 1202, preferably radially closer to the wall 1205 of the nozzle bore. Optionally, additional temperature sensing elements may be included such as at position 1207. The power of one or both of the heater 1202 and cooler 1203 may be controlled such that temperature 1208 along the wall 1205 of the nozzle bore achieves a largely singular value along the length from the inlet 1215 to the outlet 1216. The temperature 1208 may be controlled by effectively changing the amount of heating and/or cooling in response to one or more measured temperatures. Note that there exists a radial temperature gradient (shown schematically using an idealized representative curve, by a small graph above the region in question) from the heater to the cooler and from the heater to the inner wall of the nozzle bore. The principles of robustness presented throughout in an axial context apply here also.

Figure 13:
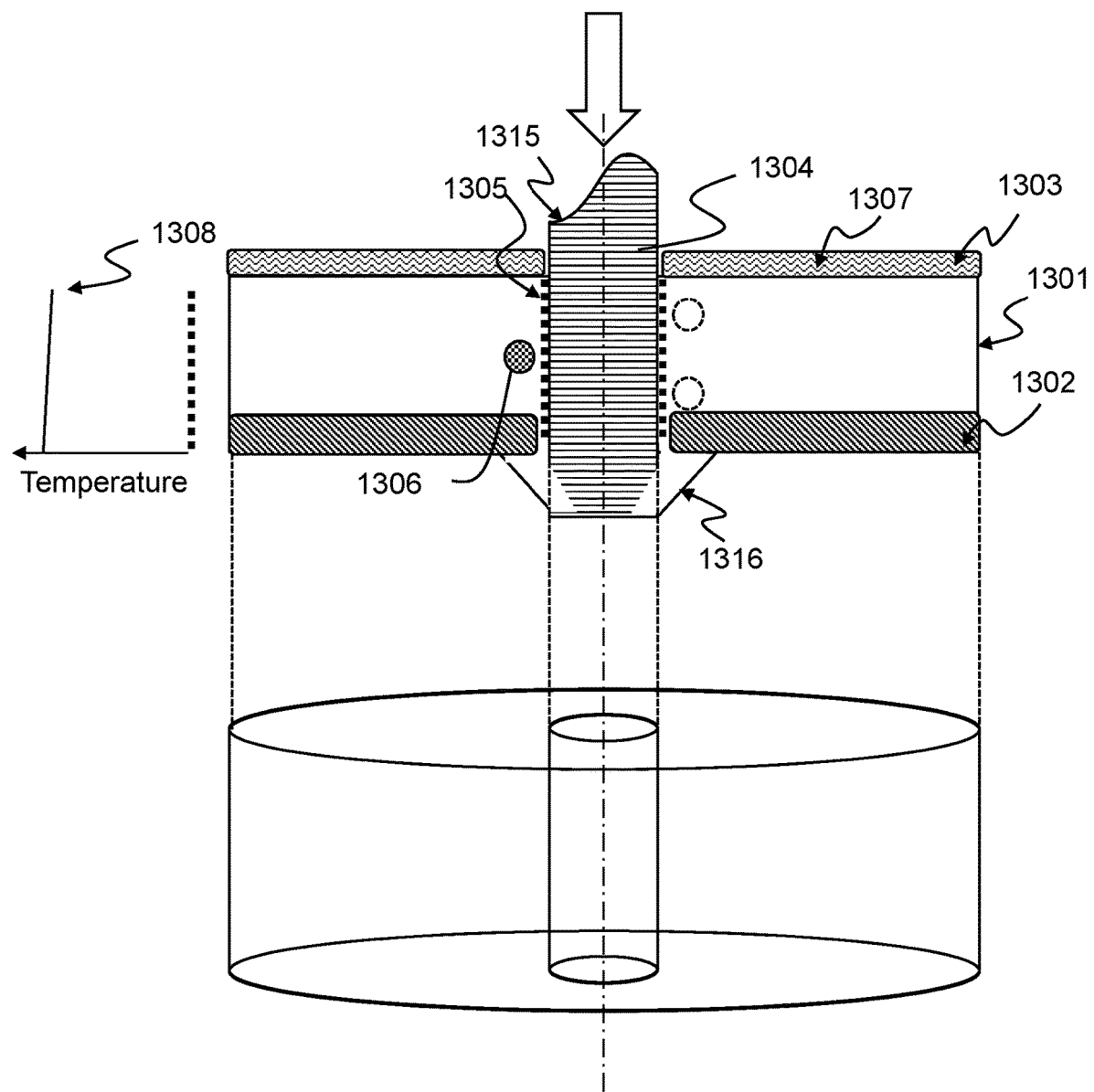
FIG. 13 shows, schematically, in cross-section above and representative 3D below, a nozzle of an invention hereof with heating and cooling arranged axially, both relatively near to the outlet.

In another embodiment, shown schematically in FIG. 13, a substantially uniform wall temperature is desired. Using the principles taught herein, this can be substantially realized by providing a nozzle 1301 with a very small axial length between inlet 1315 and outlet 1316. This brings the two active thermal actuators, the heater 1302 and the cooler 1303 into much closer communication with each other. Importantly, the compact geometry minimizes the change in temperature required to flow the same amount of thermal power from the heater 1302 to the cooler 1303 through the nozzle body 1301 due to the substantially lesser thermal resistance, as compared to a substantially longer nozzle body. The nozzle bore 1305 achieves a substantially uniform temperature profile 1308, shown as an idealized curve on the small graph to the left of the nozzle body 1301. A temperature sensing element 1306 may be placed near the nozzle bore 1305. Optionally, temperature sensing elements 1307 may be placed at positions near the inlet side and outlet side. The temperature at location of sensor 1306 or temperatures at the locations of sensors 1307 may be controlled by effectively changing the amount of heating and/or cooling in response to one or more measured temperatures.

As previously stated, an extrusion system characterized by a high TPR is the most robust. In some embodiments, a large amount of losses may be used to assist a cooler that cannot, by itself, achieve the desired amount of thermal power extraction from the nozzle. Establishing a relatively large amount of losses to the environment may be accomplished by, for example, radiative or convective losses to the environment at locations along the distance between the heater and the cooler. The geometry of the nozzle body may deliberately be tailored to increase these losses, for example, by providing fins or other high surface area features known in the art.

A design with a small amount of power lost to the environment, as compared to the thermal power extracted by cooling, may offer improved robustness of the temperature and temperature profile because the thermal power flow is largely axial and does not deviate as much towards the exterior surfaces of the nozzle, where the losses occur. Such a design may offer improved controllability because the range of total thermal powers extracted from the system (the summation of deliberate cooling and passive losses) is larger, because large passive losses impose a minimum amount of power extraction that will always be present during operation (i.e. some amount of thermal power is flowing through and out of the nozzle body even when the active cooling is not running). Losses to the environment may be minimized by, for example, the use of thermal insulation layers, radiation shielding, high thermal resistance mechanical attachment points or the like.

The heating system 306 of a thermally robust nozzle may employ any of the heating devices or techniques described herein. In general, the heating system may be operable to heat the build material, e.g., a MCMP build material as described above (or a thermoplastic) within the nozzle body to a temperature within the working temperature range for the build material.

Regarding build materials, it will now be understood that any partially or wholly metallic mixture that exhibits suitable rheological behavior within a working temperature range may be adapted for use in an extrusion-type additive manufacturing process as contemplated herein. For example, many of the MCMP compositions described above have medium viscosity within a working temperature range of around one hundred to around one thousand Pascal seconds, a range of viscosities at which the materials can be mechanically engaged and extruded to form an object.

It will also be understood that the principles of the invention may usefully be applied to additive fabrication based on the extrusion of build materials such as thermoplastic polymers of the type used in the 3D Printing art, including, but not limited to PLA, ABS, Ultem, polycarbonate, PEEK and nylon. In another aspect, the principles of the invention may usefully be applied to additive fabrication based on extrusion of build materials such as bulk metallic glasses, or any other build materials that may benefit from, e.g., thermally overdriving a heated nozzle as described herein in order to reduced variations in temperature along the interior surface of a bore as build material passes from an inlet to an outlet.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form

Aspects of Inventions

The following aspects of invention hereof are intended to be described herein, and this section is to ensure that they are mentioned. They are named aspects, and although they appear similar to claims, they are not claims. However, at some point in the future, the applicants reserve the right to claim any and all of these aspects in this and any related applications.

A1. A method for conditioning MCMP build material within a bore of a nozzle, the nozzle having an inlet and an outlet and the bore there-between, through which the build material passes from the inlet to the outlet, the build material having a working temperature range that includes a first temperature for mechanically driving the material into the inlet and a second, greater temperature, for extruding the build material out from the nozzle outlet, there being an amount of thermal power required to condition build material at a steady state passing through the nozzle to the second temperature, this amount being termed the conditioning amount of thermal power, the method comprising:
  a. providing a quantity of build material within the nozzle;
  b. removing a first amount of thermal power from the nozzle near the nozzle inlet, the first amount of thermal power being at least half of the conditioning amount of thermal power
  c. adding a second amount of thermal power to the nozzle near the nozzle outlet, which second amount of thermal power is greater than the sum of the first amount of thermal power and the conditioning amount of thermal power.

A2. The method of aspect A1, the step of removing a first amount of thermal power comprising removing a first amount of thermal power, the first amount of thermal power being at least as large as the conditioning amount of thermal power.

A3. The method of aspect A1, the step of removing a first amount of thermal power comprising removing a first amount of thermal power, the first amount of thermal power being at least twice as large as the conditioning amount of thermal power.

A4. The method of aspect A1, the step of removing a first amount of thermal power comprising removing a first amount of thermal power, the first amount of thermal power being at least three times as large as the conditioning amount of thermal power.

A5. The method of aspect A1, the step of removing a first amount of thermal power comprising removing a first amount of thermal power, the first amount of thermal power being at least five times as large as the conditioning amount of thermal power.

A6. The method of aspect A1, the step of removing a first amount of thermal power comprising removing a first amount of thermal power, the first amount of thermal power being at least ten times as large as the conditioning amount of thermal power.

A7. The method of aspect A1, further comprising the step of measuring the temperature of the nozzle outlet, the step of adding a second amount of thermal power comprising, adding a second amount of thermal power the amount determined in part based on the measured outlet temperature such that the temperature of the nozzle at the outlet is at least as large as the second temperature.

A8. The method of aspect A7, further comprising the step of measuring the temperature of the nozzle inlet, the step of removing an amount of thermal power comprising, removing an amount of thermal power, the amount determined in part based on the measured inlet temperature such that the temperature of the nozzle at the inlet is less than or equal to the first temperature.

A9. The method of aspect A1 the nozzle comprising a nozzle of an additive manufacturing system.

A10. The method of aspect A9 the additive manufacturing system comprising a fused filament fabrication system.

A11. The method of aspect A1, where there is also an amount of thermal power that is lost to the environment around the nozzle, the step of adding a second amount of thermal power to the nozzle near the nozzle outlet, comprises adding a second amount of thermal power that is approximately equal to the sum of the first amount of thermal power and the conditioning amount of thermal power, and the amount of thermal power that is lost to the environment around the nozzle.

A12. The method of aspect A1, the step of removing an amount of thermal power comprising thermally coupling a flowing coolant fluid near the nozzle inlet.

A13. The method of aspect A1, the build material comprising a metal alloy that exhibits a multi-phase equilibrium between a solid phase and a liquid phase and which is characterizeable by a phase diagram having a solidus temperature and a liquidus temperature, the step of providing build material comprising providing build material having a composition that assumes a multi-phase condition at temperatures between the solidus temperature and the liquidus temperature.

A14. The method of aspect A13, where the primary alloying elements of the metal alloy are selected from the group consisting of: lead/tin (Pb/Sn); aluminum/silicon (Al/Si); aluminum/zinc (Al/Zn); tin/copper (Sn/Cu); and Aluminum Silicon Magnesium (Mg/Si/A).

A15. The method of aspect A13, the metal alloy comprising an alloy having a liquidus temperature that is greater than the second temperature for extruding and a solidus temperature that is less than the second temperature for extrusion.

A16. The method of aspect A13, the metal alloy comprising an alloy having a solidus temperature that is greater than the first temperature for mechanically driving the build material.

A17. The method of aspect A1 wherein the MCMP material comprises mixture of a metallic composition and a high-temperature inert second phase, wherein the metallic composition includes a metal or a metal alloy and wherein the high-temperature inert second phase includes a composition that remains a solid at a temperature substantially above a liquidus temperature of the metallic composition.

A18. The method of aspect A17 wherein the extrusion temperature is greater than the solidus temperature of the metallic composition.

A19. The method of aspect A17, the inert second phase comprising a ceramic.

A20. The method of aspect A17, the inert second phase comprising an intermetallic or a metallic.

A21. The method of aspect A1, the MCMP material comprising an alloy that is characterized by a phase diagram that exhibits a eutectic.

A22. The method of aspect A1, the MCMP material comprising an alloy that is characterized by a phase diagram that exhibits a peritectic.

A23. The method of aspect A1, the MCMP material comprising an isomorphous alloy.

A24. The method of aspect A1, the MCMP material comprising a metal-loaded extrudable composite.

A25. The method of aspect A24, the metal-loaded extrudable composite comprising a metallic powder and a matrix selected from the group consisting of: a thermoplastic and a thermoplastic mixture.

A26. A method for conditioning a build material within a bore of a nozzle, the nozzle having an inlet and an outlet through which the build material passes, the build material having a working temperature range that includes an extrusion temperature for extruding the build material out from the nozzle outlet, there being an amount of thermal power required to condition build material passing through the nozzle at a steady state to the extrusion temperature, this amount being termed the conditioning amount of thermal power, the method comprising:
  a. providing a quantity of build material within the nozzle;
  b. removing a first amount of thermal power from the nozzle at least ½ as large as the conditioning amount of thermal power;
  c. adding a second amount of thermal power to the nozzle that is greater than the sum of the first amount of thermal power and the conditioning amount of thermal power.

A27. The method of aspect A26, the step of removing a first amount of thermal power comprising removing a first amount of thermal power, the first amount of thermal power being at least as large as the conditioning amount of thermal power.

A28. The method of aspect A26, the step of removing a first amount of thermal power comprising removing a first amount of thermal power, the first amount of thermal power being at least twice as large as the conditioning amount of thermal power.

A29. The method of aspect A26, the step of removing a first amount of thermal power comprising removing a first amount of thermal power, the first amount of thermal power being at least three times as large as the conditioning amount of thermal power.

A30. The method of aspect A26, the step of removing a first amount of thermal power comprising removing a first amount of thermal power, the first amount of thermal power being at least five times as large as the conditioning amount of thermal power.

A31. The method of aspect A26, the step of removing a first amount of thermal power comprising removing a first amount of thermal power, the first amount of thermal power being at least ten times as large as the conditioning amount of thermal power.

A32. The method of aspect A26, further comprising the step of measuring the temperature of the nozzle outlet, the step of adding a second amount of thermal power comprising, adding a second amount of thermal power, the second amount determined in part based on the measured outlet temperature such that the temperature of the nozzle at the outlet is at least as large as the extrusion temperature.

A33. The method of aspect A26 the nozzle comprising a nozzle of an additive manufacturing system.

A34. The method of aspect A33 the additive manufacturing system comprising a fused filament fabrication system.

A35. The method of aspect A26, where there is also an amount of thermal power that is lost to the environment around the nozzle, the step of adding a second amount of thermal power to the nozzle near the nozzle outlet, comprises adding a second amount of thermal power that is approximately equal to the sum of the first amount of thermal power and the conditioning amount of thermal power, and the amount of thermal power that is lost to the environment around the nozzle.

A36. The method of aspect A33, the step of removing an amount of thermal power comprising thermally coupling a flowing coolant fluid near the nozzle.

A37. The method of aspect A26, the build material comprising a thermoplastic.

A38. The method of aspect A26, the build material comprising a metal alloy that exhibits a multi-phase equilibrium between a solid phase and a liquid phase and which is characterizeable by a phase diagram having a solidus temperature and a liquidus temperature, the step of providing build material comprising providing build material having a composition that assumes a multi-phase condition at temperatures between the solidus temperature and the liquidus temperature.

A39. The method of aspect A26, the step of removing a first amount of thermal power from the nozzle comprising removing a first amount of thermal power from the nozzle near the nozzle outer surface.

A40. The method of aspect A26, the step of adding a second amount of thermal power to the nozzle comprising adding a second amount of thermal power to the nozzle at a location near the nozzle bore.

A41. The method of aspect A39, the step of adding a second amount of thermal power to the nozzle comprising adding a second amount of thermal power to the nozzle at a location near the nozzle bore.

A42. The method of aspect A39, further comprising the step of measuring the temperature of the nozzle at an inner location between the core and the location of adding thermal power, the step of adding a second amount of thermal power comprising, adding a second amount of thermal power determined based in part on the measured temperature at the inner location such that the temperature of the nozzle at the outlet is at least as large as the second temperature.

A43. The method of aspect A42, further comprising the step of measuring the temperature of the nozzle at an outer location between the nozzle outer surface and the location of removing thermal power, the step of adding a second amount of thermal power comprising, adding a second amount of thermal power determined in part based also on the measured temperature at the outer location such that the temperature of the nozzle at the outlet is at least as large as the second temperature.

A44. A nozzle for conditioning and extruding MCMP build material, the build material having a working temperature range that includes a first temperature for mechanically driving the material into nozzle and a second, greater temperature, for extruding the build material out from the nozzle, there being an amount of thermal power required to condition build material at a steady state passing through the nozzle to the second temperature, this amount being termed the conditioning amount of thermal power, the nozzle comprising:
  a. an inlet;
  b. an outlet;
  c. a bore between the inlet and the outlet, through which bore the build material passes from the inlet to the outlet;
  d. near to the inlet, a removal thermal couple configured to remove a first amount of thermal power from the nozzle to a thermal power sink, the removal couple having a capacity to remove at least ½ the conditioning amount of thermal power; and e. near to the outlet, an additive thermal couple configured to add a second amount of thermal power from a source to the nozzle, the additive couple having a capacity capable to add a second amount of thermal power that is greater than the sum of the first amount of thermal power and the conditioning amount of thermal power.

A45. The nozzle of aspect A44, further comprising, a temperature sensor located near the outlet.

A46. The nozzle of aspect A45, further comprising a temperature sensor located near the inlet.

A47. The nozzle of aspect A44, further comprising a heater, coupled to the additive thermal couple.

A48. The nozzle of aspect A44, further comprising a cooling fluid source, coupled to the removal thermal couple.

A49. The nozzle of aspect A44, further where the removal couple has a capacity to remove at least equal to the conditioning amount of thermal power.

A50. The nozzle of aspect A44, further where the removal couple has a capacity to remove at least twice the conditioning amount of thermal power.

A51. The nozzle of aspect A44, further where the removal couple has a capacity to remove at least five times the conditioning amount of thermal power.

A52. The nozzle of aspect A44, further where the removal couple has a capacity to remove at least ten times the conditioning amount of thermal power.

A53. A nozzle for conditioning and extruding build material, the build material having a working temperature range that includes an extrusion temperature, for extruding the build material out from the nozzle, there being an amount of thermal power required to condition build material at a steady state passing through the nozzle to the extrusion temperature, this amount being termed the conditioning amount of thermal power, the nozzle comprising:
  a. an inlet;
  b. an outlet;
  c. bore between the inlet and the outlet, through which bore the build material passes from the inlet to the outlet;
  d. a removal thermal couple configured to remove a first amount of thermal power from the nozzle to a thermal power sink the removal thermal couple having a capacity to remove at least ½ the conditioning amount of thermal power,
  e. an additive thermal couple configured to add a second amount of thermal power from a source to the nozzle, the additive thermal couple having a capacity capable to add a second amount of thermal power that is greater than the sum of the first amount of thermal power and the conditioning amount of thermal power, combined.

A54. The nozzle of aspect A53 the bore, inlet and outlet all being components of a nozzle body, the body having an outer surface, wherein the removal thermal couple is located near the body outer surface.

A55 The nozzle of aspect A53, wherein the additive thermal couple is located near the nozzle bore.

A56. The nozzle of aspect A54, further comprising a temperature sensor located near the removal thermal couple.

A57. The nozzle of aspect A55, further comprising a temperature sensor located between the additive thermal couple and the bore.

A58. The nozzle of aspect A53, further comprising a cooling fluid source, coupled to the removal thermal couple.

A59. The nozzle of aspect A53, further where the removal couple has a capacity to remove at least equal to the conditioning amount of thermal power.

A60. The nozzle of aspect A53, further where the removal couple has a capacity to remove at least twice the conditioning amount of thermal power.

A61. The nozzle of aspect A53, further where the removal couple has a capacity to remove at least five times the conditioning amount of thermal power.

A62. The nozzle of aspect A53, further where the removal couple has a capacity to remove at least ten times the conditioning amount of thermal power.

A63. A method for operating an extruder of a three-dimensional printer, the method comprising: providing a nozzle including an inlet, an outlet and a bore coupling the inlet to the outlet; driving a build material through the bore, the build material including a metal-containing multi-phase material; and providing a conditioning amount of thermal power to the build material passing from the inlet to the outlet to raise the build material at the outlet to a predetermined temperature by adding a first amount of thermal power to the nozzle near the outlet and removing a second amount of thermal power from the nozzle near the inlet, wherein the conditioning amount is at least half of the second amount, and wherein the first amount is greater than a sum of the conditioning amount and the second amount.

A.64 A method for operating an extruder of a three-dimensional printer, the method comprising: providing a nozzle including an inlet, an outlet and a bore coupling the inlet to the outlet; driving a build material through the bore, the build material including a metal-containing multi-phase material; and providing a conditioning amount of thermal power to the build material passing from the inlet to the outlet to raise the build material at the outlet to a predetermined temperature by adding a first amount of thermal power to the nozzle near the outlet and removing a second amount of thermal power from the nozzle near the inlet, wherein the conditioning amount is at least one third of the second amount, and wherein the first amount is greater than a sum of the conditioning amount and the second amount.

A.65 The method of aspect A.64 wherein the conditioning amount is at least 0.45 times the second amount.

The invention claimed is:

1. A method for conditioning a metal-containing multi-phase (MCMP) build material within a bore of a nozzle, the nozzle defining an inlet and an outlet and the bore therebetween, through which the build material passes from the inlet to the outlet, the build material having a working temperature range that includes a first temperature for mechanically driving the build material into the inlet and a second, greater temperature, for extruding the build material out from the outlet, there being an amount of thermal power required to condition build material passing through the nozzle to the second temperature, this amount being a conditioning amount of thermal power, the method comprising:
  a. providing a quantity of build material within the nozzle;
  b. removing a first amount of thermal power from the nozzle near the inlet, the first amount of thermal power being at least half of the conditioning amount of thermal power; and
  c. adding a second amount of thermal power to the nozzle near the outlet, which second amount of thermal power is greater than sum of the first amount of thermal power and the conditioning amount of thermal power.

2. The method of claim 1, the step of removing a first amount of thermal power comprising removing a first amount of thermal power, the first amount of thermal power being at least as large as the conditioning amount of thermal power.

3. The method of claim 1, the step of removing a first amount of thermal power comprising removing a first amount of thermal power, the first amount of thermal power being at least twice as large as the conditioning amount of thermal power.

4. The method of claim 1, further comprising a step of measuring the temperature of the nozzle at the outlet, the step of adding a second amount of thermal power comprising, adding a second amount of thermal power, the second amount of thermal power determined in part based on the measured outlet temperature such that the temperature of the nozzle at the outlet is at least as large as the second temperature.

5. The method of claim 4, further comprising a step of measuring the temperature of the inlet of the nozzle, the step of removing an amount of thermal power comprising, removing an amount of thermal power, the amount determined in part based on the measured inlet temperature such that the temperature of the nozzle at the inlet is less than or equal to the first temperature.

6. The method of claim 1, the step of removing an amount of thermal power comprising thermally coupling a flowing coolant fluid near the inlet.

7. The method of claim 1, the build material comprising a metal alloy that exhibits a multi-phase equilibrium between a solid phase and a liquid phase and which is characterizeable by a phase diagram having a solidus temperature and a liquidus temperature, the step of providing build material comprising providing build material having a composition that assumes a multi-phase condition at temperatures between the solidus temperature and the liquidus temperature.

8. The method of claim 1, the MCMP material comprising an alloy that is characterized by a phase diagram that exhibits a eutectic phase.

9. The method of claim 1, the MCMP material comprising an alloy that is characterized by a phase diagram that exhibits a peritectic phase.

* * * * *